(12) United States Patent
Orihara

(10) Patent No.: US 9,722,313 B2
(45) Date of Patent: Aug. 1, 2017

(54) ANTENNA DEVICE AND ELECTRONIC EQUIPMENT

(71) Applicant: Dexerials Corporation, Shinagawa-ku, Tokyo (JP)

(72) Inventor: Katsuhisa Orihara, Utsunomiya (JP)

(73) Assignee: DEXERIALS CORPORATION, Shinagawa-ku, Tokyo (JP)

( * ) Notice: Subject to any disclaimer, the term of this patent is extended or adjusted under 35 U.S.C. 154(b) by 22 days.

(21) Appl. No.: 14/774,233

(22) PCT Filed: Mar. 11, 2014

(86) PCT No.: PCT/JP2014/056316
§ 371 (c)(1),
(2) Date: Sep. 10, 2015

(87) PCT Pub. No.: WO2014/148314
PCT Pub. Date: Sep. 25, 2014

(65) Prior Publication Data
US 2016/0064822 A1 Mar. 3, 2016

(30) Foreign Application Priority Data
Mar. 19, 2013 (JP) .................. 2013-056778

(51) Int. Cl.
*H01Q 1/24* (2006.01)
*H01Q 7/06* (2006.01)
(Continued)

(52) U.S. Cl.
CPC ......... *H01Q 7/06* (2013.01); *G06K 19/07771* (2013.01); *H01Q 1/2208* (2013.01); *H01Q 1/243* (2013.01); *H01Q 1/38* (2013.01)

(58) Field of Classification Search
CPC .... H01Q 1/2206; H01Q 1/2208; H01Q 1/243; H01Q 7/06
See application file for complete search history.

(56) References Cited

U.S. PATENT DOCUMENTS 8,922,444 B2 * 12/2014 Yosui ............... G06K 19/07779
343/702
9,166,291 B2 * 10/2015 Kato ..................... H01Q 1/38

FOREIGN PATENT DOCUMENTS

CN 102687338 A 9/2012
JP 2005-303541 A 10/2005
(Continued)

OTHER PUBLICATIONS

May 18, 2016, Office Action issued by the Korean Intellectual Property Office in the corresponding Korean Patent Application No. 10-2015-7025489.
(Continued)

*Primary Examiner* — Hoang Nguyen
(74) *Attorney, Agent, or Firm* — Kenja IP Law PC

(57) ABSTRACT

An antenna device according to one of embodiments includes: an antenna substrate around which an antenna coil is wound; metallic foil arranged on the antenna substrate to be superposed on a portion of the antenna coil; and a magnetic sheet arranged to be superposed on the antenna coil. On the first side of the antenna coil in which a current flowing is carried in one direction, the antenna coil is closer to the reader/writer than the magnetic sheet is, and/or, on the second side of the antenna coil in which the current flowing is carried in another direction, the magnetic sheet is closer to the reader/writer than the antenna coil is. The metallic foil is superposed on the second side of the antenna coil.

18 Claims, 19 Drawing Sheets

(51) Int. Cl.
*H01Q 1/22* (2006.01)
*G06K 19/077* (2006.01)
*H01Q 1/38* (2006.01)

(56) References Cited

FOREIGN PATENT DOCUMENTS

| | | |
|---|---|---|
| JP | 2006-129003 A | 5/2006 |
| JP | 2011103702 A | 5/2011 |
| JP | 2011-139533 A | 7/2011 |
| JP | 2012-060626 A | 3/2012 |
| JP | 2012-065368 A | 3/2012 |
| JP | 4978756 B2 | 7/2012 |
| WO | 2011/077877 A1 | 6/2011 |
| WO | 2013/011865 A1 | 1/2013 |

OTHER PUBLICATIONS

Jul. 8, 2014 International Search Report issued in International Patent Application No. PCT/JP2014/056316.
Dec. 2, 2016, Office Action issued by the State Intellectual Property Office in the corresponding Chinese Patent Application No. 201480016726.2.
Nov. 17, 2016, Office Action issued by the Korean Intellectual Property Office in the corresponding Korean Patent Application No. 10-2015-7025489.

\* cited by examiner

FIG. 1
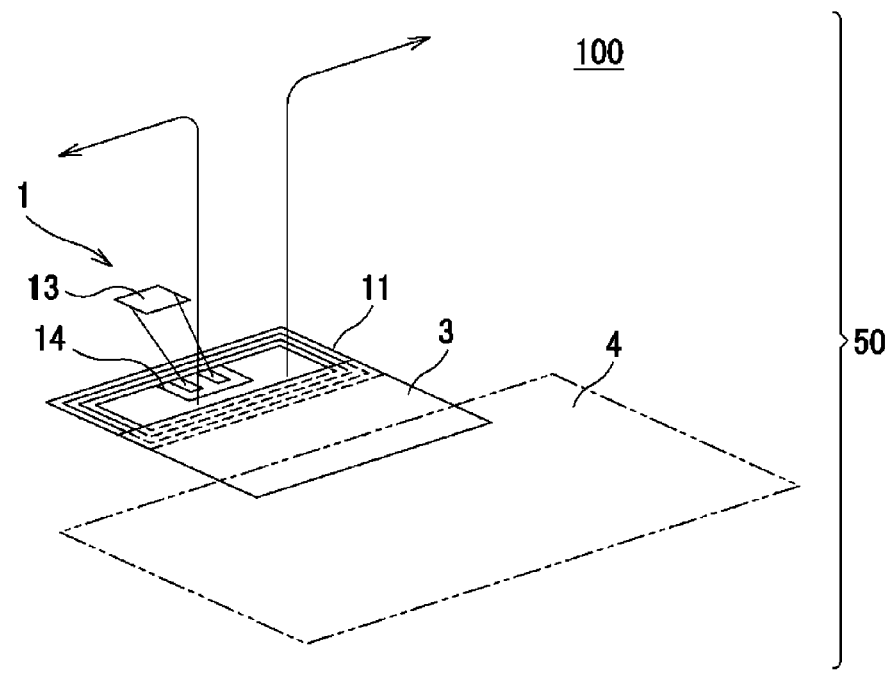
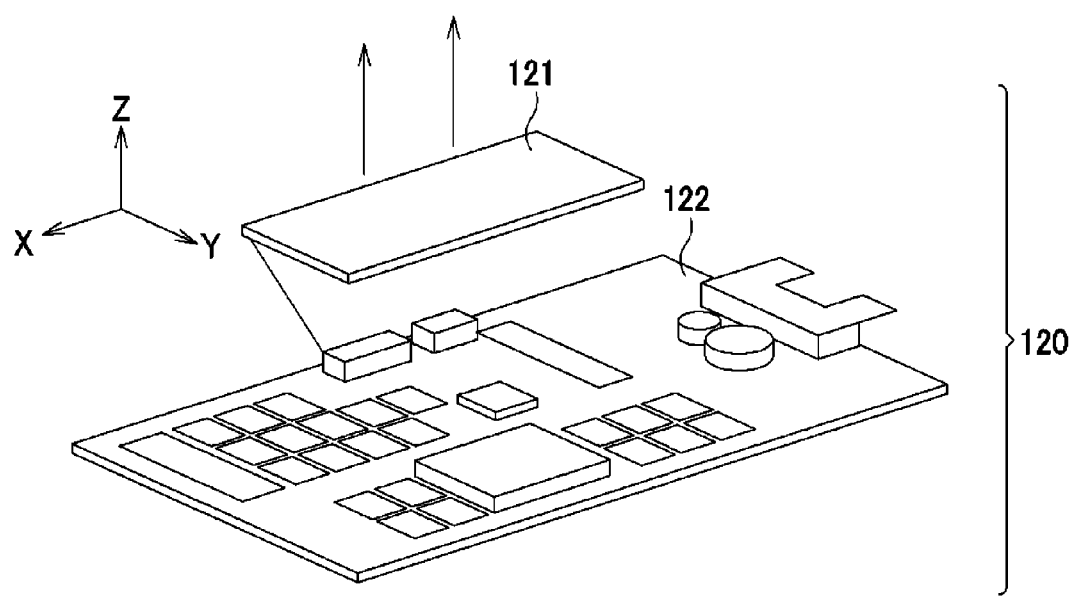

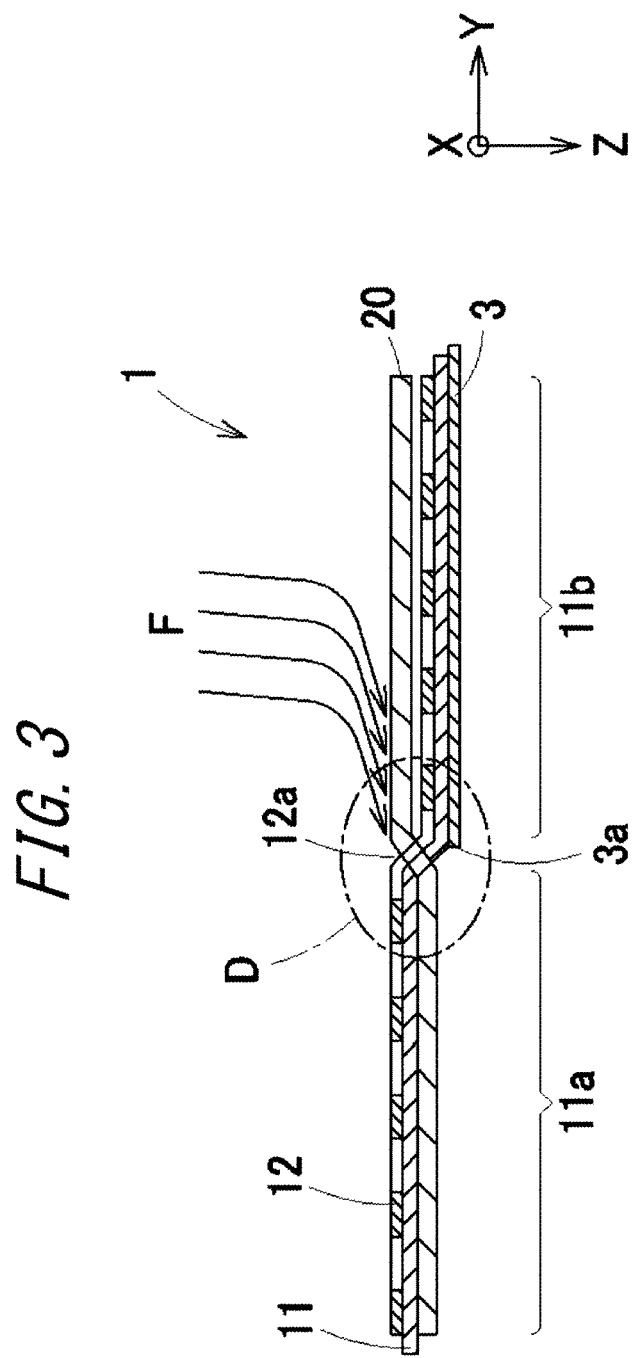

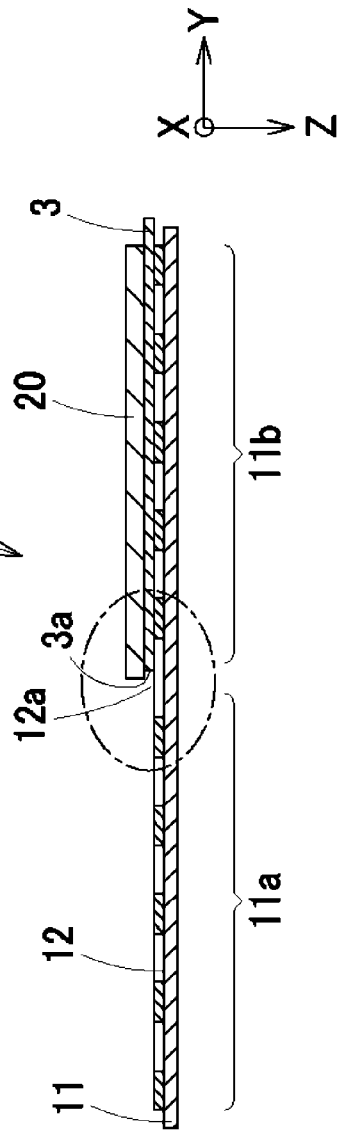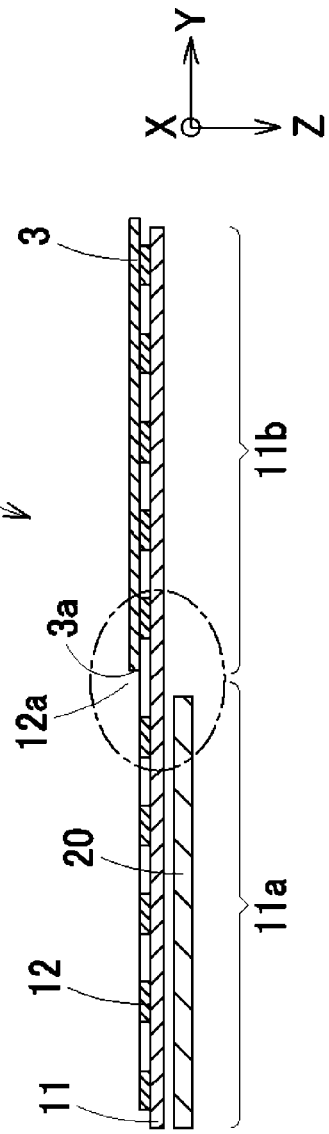

ANTENNA DEVICE AND ELECTRONIC EQUIPMENT

TECHNICAL FIELD

The present disclosure relates to an antenna device that is used in electronic equipment and that is configured to communicate with external equipment through an electromagnetic signal and also to electronic equipment such an antenna device. The present disclosure is based on and claims the priority of Japanese Patent Application No. 2013-056778 filed in Japan on Mar. 19, 2013, which is herein incorporated by reference.

BACKGROUND

Conventionally, electronic equipment such as a mobile phone, a smartphone, and a tablet PC have used an RFID (Radio Frequency Identification) antenna module to provide a near field contactless communication function. An antenna module for providing a contactless charging function is also being used more and more popularly.

Such an antenna module communicates with an antenna coil embedded in a transmitter of a power-transmitting device (hereinafter, simply called a reader/writer or the like) of a reader/writer and a contactless charging system, by utilizing inductive coupling. That is to say, the antenna module is capable of receiving a magnetic field from the reader/writer or the like by an antenna coil, converting energy of the received magnetic field to power to drive an IC serving as a communication processing unit, and charging a battery of a power-receiving device included in the contactless charging system.

For reliable communication, the antenna module needs to receive, from the reader/writer or the like, at least a certain level of magnetic flux by the antenna coil. Accordingly, the antenna module according to the conventional technique includes a loop coil that is located in a housing of the mobile phone to receive magnetic flux from the reader/writer or the like.

For example, Patent Literature 1 proposes a method for improving characteristics of a loop antenna embedded in a portable terminal apparatus, the method including arranging a flexible cable or a flat cable to surround the built in battery.

CITATION LIST

Patent literature

PTL 1: JP2005303541A

SUMMARY

Technical Problems

The apparatus disclosed in Patent Literature 1 includes the antenna arranged in space available in the housing, and therefore, it is difficult to maintain the shape of the antenna to be constant, and the magnitude of change in inductance is increased. This leads to the problem of increased variation in resonant frequency.

Especially when the antenna is formed of the flexible cable, the apparatus disclosed in Patent Literature 1 is not easily capable of regulating distribution capacitance of wiring, and this has posed the problem that considerable man-hours are required for the regulation of the resonant frequency.

Another problem is the following. An induced current is generated in a coil in response to a change in magnetic flux from the reader/writer or the like that passes through an opening portion of the coil, and, when the coil is a loop coil, a current flows in opposite directions on one side of the loop coil in which the current flowing through the wiring is carried in one direction and on the other side of the loop opposing to the one side in which the current flowing through the wiring is carried in the other direction, and the current is cancelled out. This poses the problem of difficulty in efficient coupling.

The present disclosure has been proposed in view of the above circumstances, and the present disclosure is to provide an antenna device that, when used in electronic equipment, is capable of providing excellent communication characteristics, and electronic equipment including the antenna device.

Solution to Problems

In one of aspects for solving the aforementioned problems, the present disclosure provides an antenna device configured to communicate with external equipment through an electromagnetic signal. According to one of embodiments, the antenna device includes: an antenna substrate around which an antenna coil, which is configured to be inductively coupled to the external equipment, is wound; a conductive body in the form of a sheet that is arranged on the antenna substrate to be superposed on a portion of the antenna coil; and a magnetic sheet that is arranged to be superposed on at least a portion of the antenna coil and that is configured to attract a magnetic field emitted from the external equipment to the antenna coil. On the first side of the antenna coil in which a current flowing through wiring of the antenna coil is carried in one direction, the antenna coil is closer to the external equipment than the magnetic sheet is, and/or, on the second side of the antenna coil in which the current flowing through the wiring of the antenna coil is carried in another direction that is opposite to the one direction, the magnetic sheet is closer to the external equipment than the antenna coil and the conductive body are. The conductive body is superposed only on the second side of the antenna coil.

The present disclosure also provides an antenna device configured to communicate with external equipment through an electromagnetic signal according to another embodiment. The antenna device according to the embodiment includes: a member constituting a housing of the external equipment; an antenna substrate which is arranged on an inner surface of the member and around which an antenna coil, which is configured to be inductively coupled to the external equipment, is wound; a conductive body in the form of a sheet that is arranged on the antenna substrate to be superposed on a portion of the antenna coil; and a magnetic sheet that is arranged to be superposed on at least a portion of the antenna coil and that is configured to attract a magnetic field emitted from the external equipment to the antenna coil. On the first side of the antenna coil in which a current flowing through wiring of the antenna coil is carried in one direction, the antenna coil is closer to the external equipment than the magnetic sheet is, and/or, on the second side of the antenna coil in which the current flowing through the wiring of the antenna coil is carried in another direction that is opposite to the one direction, the magnetic sheet is closer to the external equipment than the antenna coil and the conductive body are. The conductive body is superposed only on the second side of the antenna coil.

The member constituting the housing of the electronic equipment may include a metal portion as a component thereof, and the conductive body may be superposed on a portion of the metal portion.

In another aspect, the present disclosure provides electronic equipment including an antenna device configured to communicate with external equipment through an electromagnetic signal. According to one of embodiments, the antenna device includes: an antenna substrate around which an antenna coil, which is configured to be inductively coupled to the external equipment, is wound; a conductive body in the form of a sheet that is arranged on the antenna substrate to be superposed on a portion of the antenna coil; and a magnetic sheet that is arranged to be superposed on at least a portion of the antenna coil and that is configured to attract a magnetic field emitted from the external equipment to the antenna coil. On the first side of the antenna coil in which a current flowing through wiring of the antenna coil is carried in one direction, the antenna coil is closer to the external equipment than the magnetic sheet is, and/or, on the second side of the antenna coil in which the current flowing through the wiring of the antenna coil is carried in another direction that is opposite to the one direction, the magnetic sheet is closer to the external equipment than the antenna coil and the conductive body are. The conductive body is superposed only on the second side of the antenna coil.

The present disclosure also provides electronic equipment including an antenna device configured to communicate with external equipment through an electromagnetic signal according to another embodiment. The antenna device according to the embodiment includes: a member constituting a housing of the external equipment; an antenna substrate which is arranged on an inner surface of the member and around which an antenna coil, which is configured to be inductively coupled to the external equipment, is wound; a conductive body in the form of a sheet that is arranged on the antenna substrate to be superposed on a portion of the antenna coil; and a magnetic sheet that is arranged to be superposed on at least a portion of the antenna coil and that is configured to attract a magnetic field emitted from the external equipment to the antenna coil. On the first side of the antenna coil in which a current flowing through wiring of the antenna coil is carried in one direction, the antenna coil is closer to the external equipment than the magnetic sheet is, and/or, on the second side of the antenna coil in which the current flowing through the wiring of the antenna coil is carried in another direction that is opposite to the one direction, the magnetic sheet is closer to the external equipment than the antenna coil and the conductive body are. The conductive body is superposed only on the second side.

Advantageous Effects

The antenna device and the electronic equipment including the antenna device according to the present disclosure, with the conductive body being superposed on a portion of the antenna coil and with the magnetic sheet being superposed on the antenna coil, gather magnetic flux in the end portion of the conductive body and introduce the gathered magnetic flux to the magnetic sheet, thereby inducing a current in the antenna coil efficiently and stabilizing communication characteristics. Furthermore, a current flowing through the antenna coil is induced more intensely on the first side than on the second side, and accordingly, communication characteristics are improved.

BRIEF DESCRIPTION OF THE DRAWINGS

In the accompanying drawings:

FIG. 1 is a perspective view illustrating a schematic configuration of a contactless communications system including an antenna device according to the present disclosure;

FIG. 2A is a perspective view, FIG. 2B is a sectional view taken along a line AA', and FIG. 2C is an enlarged sectional view of a portion of FIG. 2B that is surrounded by a dashed line;

FIG. 3 is a sectional view illustrating a principle of operation of an antenna device according to the present disclosure;

FIG. 4A is a perspective view, FIG. 4B is a sectional view taken along a line AA', and FIG. 4C is an enlarged sectional view of a portion of FIG. 4B that is surrounded by a dashed line;

FIG. 5A is a perspective view, FIG. 5B is a sectional view taken along a line AA', and FIG. 5C is an enlarged sectional view of a portion of FIG. 5B that is surrounded by a dashed line;

FIG. 6A is a perspective view, FIG. 6B is a sectional view taken along a line AA', and FIG. 6C is an enlarged sectional view of a portion of FIG. 6B that is surrounded by a dashed line;

FIG. 7A is a perspective view, FIG. 7B is a sectional view taken along a line AA', and FIG. 7C is an enlarged sectional view of a portion of FIG. 7B that is surrounded by a dashed line;

FIG. 8A is a perspective view, FIG. 8B is a sectional view taken along a line AA', and FIG. 8C is an enlarged sectional view of a portion of FIG. 8B that is surrounded by a dashed line;

FIG. 9A is a perspective view, FIG. 9B is a sectional view taken along a line AA', and FIG. 9C is an enlarged sectional view of a portion of FIG. 9B that is surrounded by a dashed line;

FIG. 10A is a sectional view of a modification in which metallic foil is provided on one surface of an antenna substrate that is closer to a reader/writer when a magnetic sheet is located only on the second side of the antenna coil, and FIG. 10B is a sectional view of a modification in which metallic foil is provided on one surface of an antenna substrate that is closer to a reader/writer when a magnetic sheet is located only on the first side of the antenna coil;

FIG. 11A is a perspective view, and FIG. 11B is a sectional view taken along a line BB';

FIG. 12A is a perspective view, and FIG. 12B is a sectional view taken along a line BB';

FIG. 13A is a perspective view, and FIG. 13B is a sectional view taken along a line BB';

FIG. 14A is a perspective view, FIG. 14B is a sectional view taken along a line CC', and FIG. 14C is an enlarged sectional view of a portion of FIG. 14B that is surrounded by a dashed line;

FIG. 15A is a perspective view, FIG. 15B is a sectional view taken along a line DD', and FIG. 15C is a sectional view taken along a line CC";

DETAILED DESCRIPTION

Figure 2A:
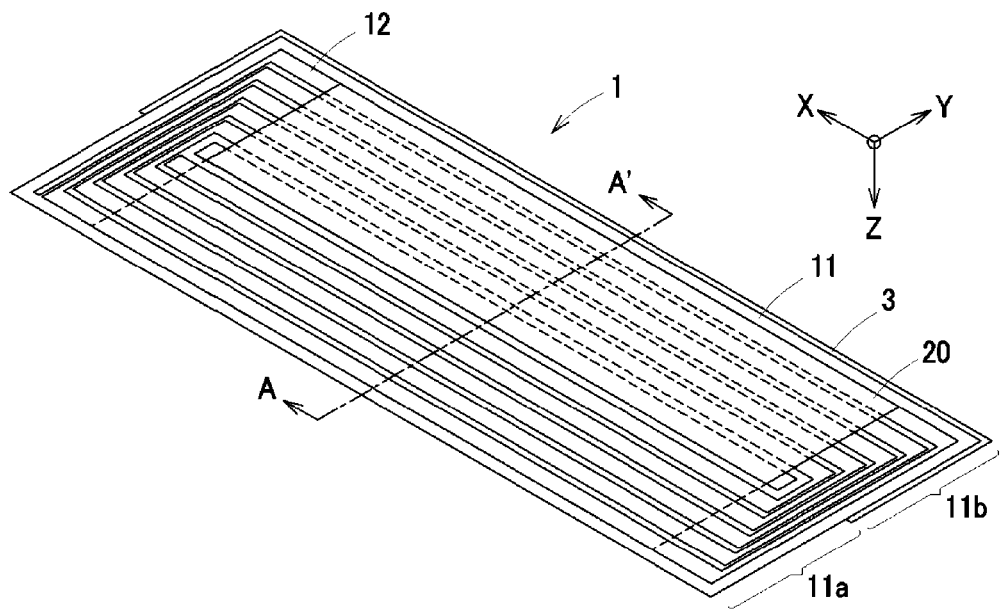
FIGS. 2A to 2C illustrate an exemplary configuration of an antenna device according to one of embodiments of the present disclosure.

Embodiments of an antenna device and electronic equipment according to the present disclosure will be described in detail below with reference to the drawings. However, the present disclosure is not limited to the following embodiments. Needless to say, various changes may be made to the embodiments without departing from the gist of the present disclosure. The drawings are schematically drawn and are not necessarily to scale to represent actual proportion or the like. Specific dimensions or the like is to be determined in accordance with the following description. Furthermore, it is a matter of a fact that relative dimensions and proportion may differ from one figure to another.

[Exemplary Configuration of Contactless Communication System]

An antenna device 1 according to the present disclosure is a device that is used in electronic equipment 50 and that is configured to communicate with external equipment through an electromagnetic signal. The antenna device 1 is used, for example, in a contactless communications system 100 for Radio Frequency Identification (RFID) as illustrated in FIG. 1. The electronic equipment 50 may include portable terminal equipment such as a mobile phone, a smartphone, a notebook PC, and a tablet PC.

The contactless communications system 100 includes an antenna device 1 and a reader/writer 120 configured to access the antenna device 1. Herein, the antenna device 1 and the reader/writer 120 are located to oppose to each other on an x-y plane in a three-dimensional orthogonal coordinate system x-y-z.

The reader/writer 120 serves as a transmitter configured to transmit a magnetic field pointing to a positive z-axis direction to the antenna device 1 that opposes to the reader/writer 120 on the x-y plane. In detail, the reader/writer 120 includes an antenna 121 configured to transmit a magnetic field to the antenna device 1 and a control substrate 122 configured to communicate with the antenna device 1 that is inductively coupled to the reader/writer 120 through the antenna 121.

In the reader/writer 120, the antenna 121 is electrically connected to the control substrate 122. The control substrate 122 is mounted with a control circuit including one or more electronic components such as an integrated circuit chip. The control circuit performs various processing based on data transmitted from the antenna device 1. For example, when transmitting data to the antenna device 1, the control circuit encodes the data, modulates a carrier of a predetermined frequency (e. g., 13.56 MHz, or approximately 100 kHz if in a contactless charging system) based on the encoded data, amplifies a modulation signal resulting from the modulation, and drives the antenna 121 with the amplified modulation signal. When retrieving data from the antenna device 1, the control circuit amplifies a modulation signal of the data received by the antenna 121, demodulates a modulation signal of the amplified data, and decodes the demodulated data. The control circuit may use modulation formats and encoding formats, such as Manchester encoding format and an Amplitude Shift Keying (ASK) modulation format, that are typically employed in reader/writers.

Although a description is given below mainly of an antenna device used in the contactless communications system, the present disclosure may, of course, be similarly applied to a contactless charging system complying with the Q standard or the like.

[Configuration of Antenna Device]

The antenna device 1 is used in a housing of electronic equipment, such as a mobile phone, that is arranged to oppose to the reader/writer 120 on the x-y plane during communication. As illustrated in FIG. 1, the antenna device 1 includes an antenna coil 12 embedded in the housing of the electronic equipment and configured to communicate with the reader/writer 120 that is inductively coupled to the antenna device 1 and also includes an antenna substrate 11 on which the antenna coil 12 is mounted. The antenna device 1 may also include a communication processing unit 13 configured to be driven by power generated by the antenna coil 12. On a surface of the antenna substrate 11 that is opposite to a surface thereof opposing to the reader/writer 120, metallic foil 3 is arranged to be superposed over a portion of the antenna coil 12. Herein, the housing of the electronic equipment, such as a mobile phone, is equipped with a control substrate mounted with a control circuit for controlling operation of the electronic equipment, a battery for driving the electronic equipment, or the like. These are internal structures of the electronic equipment that are at least partially made of a metallic material, and these are arranged in the vicinity of, or superposed over, the antenna device 1 to oppose the reader/writer 120. These internal structures are collectively denoted as a metallic plate 4.

In the following description, unless otherwise specified, a magnetic field emitted from the reader/writer 120 is assumed to point to the positive z-axis direction, and the antenna substrate 11 is assumed to be arranged with a long side of the antenna substrate 11 extending along the x-axis direction and with a short side of the antenna substrate 11 extending along the y-axis direction.

Figure 2B:
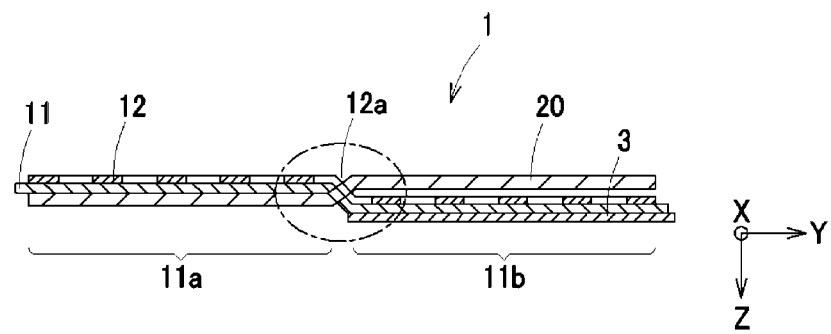
Figure 2C:
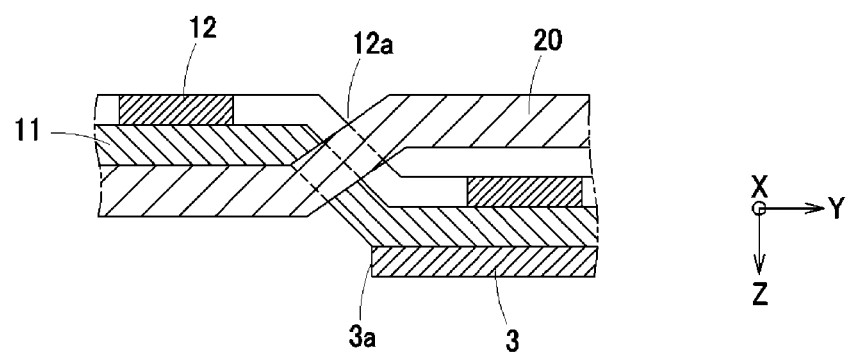

As illustrated in FIGS. 2A to 2C, the antenna device 1 includes the antenna substrate 11, the antenna coil 12 formed on one surface of the antenna substrate, and the metallic foil 3 formed on the other surface opposing to the surface that is formed with the antenna coil 12, to be superposed over a portion of the antenna coil 12.

The antenna substrate 11 is configured, for example, by a flexible substrate, and the antenna coil 12 is formed by patterning flexible wiring on one surface of the flexible substrate. The antenna coil 12 formed on the antenna substrate 11 may be formed by routing the wiring in a winding manner about a central portion 12a. To be mounted in a limited small space available in the housing of the electronic equipment, the antenna substrate 11 and the antenna coil 12 each preferably have a rectangular shape that is long in the direction along the x axis and short in the direction along the y-axis. The antenna coil 12 may be wound along the rectangular shape.

The antenna substrate 11 is arranged in a manner such that the surface formed with the antenna coil 12 opposes to the reader/writer 120 on the x-y plane during communication. Furthermore, the antenna substrate 11 defines the first side 11a and the second side 11b on both sides of the central portion 12a of the antenna coil 12 that serves as a border. On the first side 11a, the wiring of the antenna coil 12 is wound in a single direction in which a current flowing along the longitudinal direction (x-axis direction) flows, and on the second side 11b, the current flowing along the longitudinal direction flows in a direction that is opposite to the direction in which the current flows on the first side 11a, and the wiring of the antenna coil 12 is wound in this direction that is opposite to the direction in which the current flows on the first side 11a. On the surface of the antenna substrate 11 that is opposite to the surface thereof opposing to the reader/writer 120, the metallic foil 3 is formed. Similarly to the case of forming the wiring of the antenna coil 12, the metallic foil 3 may also be formed by conducting patterning processing on the surface of the antenna substrate 11 that is opposite to the surface formed with the antenna coil 12. Alternatively, the metallic foil 3 may be formed by attaching, to the surface of the antenna substrate 11 that is opposite to the surface formed with the antenna coil 12, foil of a metal, such as Al and Cu, having an area that is substantially equal to an area of the second side 11b by using an adhesive or a double-sided tape.

The antenna device 1 further includes a rectangular magnetic sheet 20 that is superposed on the antenna coil 12. A portion of the magnetic sheet 20 that is located on the first side 11a of the antenna coil is arranged on the surface of the antenna substrate 11 that is opposite to the surface thereof opposing to the reader/writer 120, and a portion of the magnetic sheet 20 that is located on the second side 11b of the antenna coil is arranged on the surface opposing to the reader/writer 120. For example, the antenna substrate 11 configured by the flexible substrate may be provided, in the central portion 12a thereof, with a slit extending in the x-axis direction, and the magnetic sheet may be inserted into the slit, and thus, the antenna device 1 may be formed.

[Principle of Operation]

The antenna device 1 generates an induced current in response to a change in magnetic flux that passes through the surface (x-y plane) opposing to the reader/writer 120. As the number of magnetic flux lines passing through is increased, and the intensity of the magnetic field is stronger, the magnitude of the induced current is increased, and accordingly, communication characteristics are more stabilized. Since magnetic flux induces an eddy current in metal and cannot enter metal, magnetic flux flows along metal.

The housing included in the electronic equipment such as a mobile phone is equipped, as the internal structures, with the control substrate including metal such as Cu wiring, a chassis of a liquid crystal panel, a metallic battery can serving as a casing of the battery for driving the electronic equipment, or the like. Magnetic flux from the reader/writer 120 flows along these metallic portions. Generally, these internal structures are present in a central portion in the housing of the electronic equipment, and magnetic flux emitted from the reader/writer 120 often gathers in a peripheral portion in the housing.

For this reason, the antenna device 1 is arranged to avoid the internal structures. By arranging the antenna device 1 in the peripheral portion in the housing, where magnetic flux shielded by the metallic portions of the internal structures gathers, communication characteristics are improved.

Furthermore, as illustrated in FIG. 3, flow of magnetic flux emitted from the reader/writer 120 is directed from the central portion to the peripheral portion in the housing to avoid metal. As a result, magnetic flux gathers especially in an end portion or a side edge portion of the metallic portions including the internal structures, and the intensity of the magnetic field is increased. In the antenna device 1, the magnetic sheet 20 is arranged in the side edge portion of the metallic portions in which magnetic flux gathers, thereby forming a channel that would guide the magnetic flux to the antenna coil 12. Accordingly, the antenna device 1 provides more reliable communication characteristics. In detail, as illustrated in FIG. 3, the metallic foil 3, which is arranged on the second side 11b of the antenna coil 12 included in the antenna device 1, has an end portion 3a that is arranged in the vicinity (in a portion D surrounded by a dashed-line circle in the figure) of the central portion 12a of the antenna coil 12 in which magnetic flux gathers. Accordingly, the gathered magnetic flux F passes through the central portion 12a and flows to a portion of the magnetic sheet 20 that is located on the first side 11a. Consequently, an induced current flows to the portion of the antenna coil 12 that is located on the first side 11a of the antenna device 1, and reliable communication characteristics are achieved.

Moreover, a current flowing through the antenna coil 12 flows in opposite directions on the first side 11a and on the second side 11b. In a small-size antenna coil in which these are arranged adjacent to each other, magnetic fields generated by a current flowing in opposite directions serve to cancel out an induced current. Accordingly, a current generated in the antenna coil is reduced. However, in the aforementioned antenna device to which the present application is applied, more magnetic flux lines are directed to the first side 11a than to the second side 11b, and a greater current is induced on the first side 11a than on the second side 11b. Accordingly, cancellation of an induced current is prevented, and power generation efficiency of the antenna coil 12 is improved.

As described earlier, a magnetic field (magnetic flux) emitted from the reader/writer 120 tends to gather in the peripheral portion in the housing of the electronic equipment, and therefore, the antenna device is preferably arranged in a manner such that the first side 11a of the antenna coil 12 is located on the peripheral side in the housing and that the second side 11b of the antenna coil 12 is located on the central side in the housing.

[Modification 1]

The magnetic sheet 20 included in the antenna device 1 does not need to cover the entire surface of the antenna coil 12 and may be superposed on a portion of the antenna coil 12 so that the magnetic sheet 20 may introduce magnetic flux gathered in the end portion 3a of the metallic foil 3 to induce a current in the antenna coil. Reducing the magnetic sheet 20 allows further thinning and weight reduction.

Figure 4A:
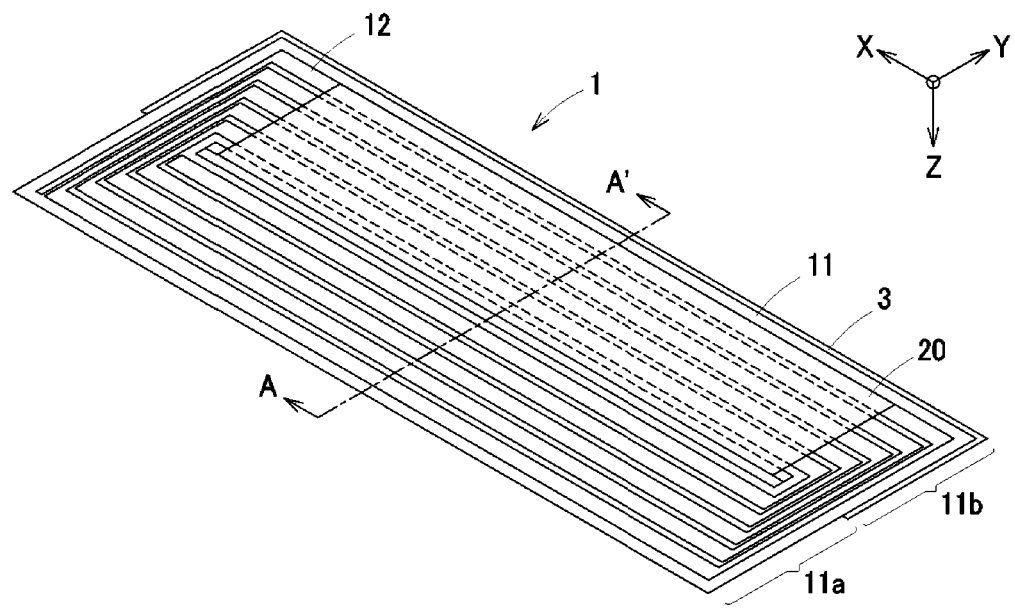
FIGS. 4A to 4C illustrate an exemplary configuration of an antenna device according to a modification of the embodiment of the present disclosure.
Figure 4B:
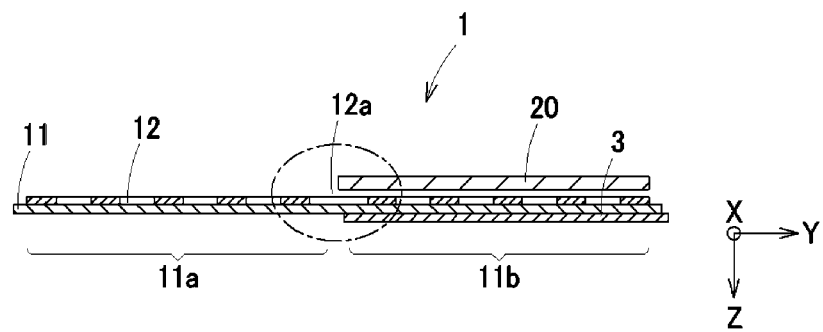

As illustrated in FIGS. 4A and 4B, the antenna device 1 includes the antenna coil 12 embedded in the housing of the electronic equipment and configured to communicate with the reader/writer 120 that is inductively coupled to the antenna device 1, the antenna substrate 11 on which the antenna coil 12 is mounted, and the communication processing unit 13 configured to be driven by power generated by the antenna coil 12. On a surface of the antenna substrate 11 that is opposite to a surface thereof opposing to the reader/writer 120, the metal foil 3 is arranged to be superposed on a portion of the antenna coil 12. The material of the antenna substrate 11, the method of forming the antenna coil, and the material and the method of forming the metallic foil 3 are the same as those in the case of FIG. 2 described above.

Figure 4C:
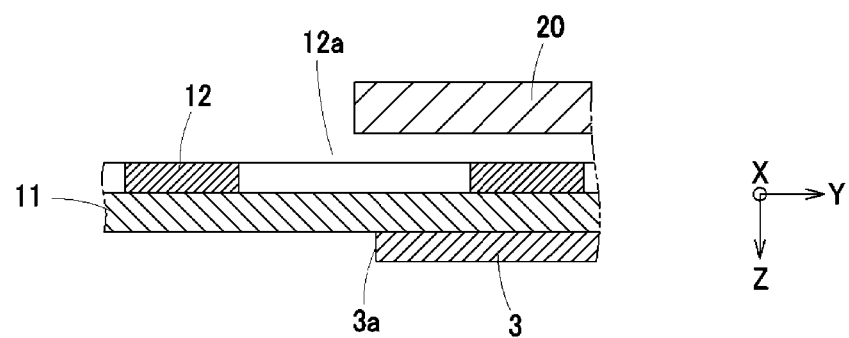

The antenna device 1 further includes the rectangular magnetic sheet 20 superposed on the antenna coil 12, and the magnetic sheet 20 in the present modification is arranged only on the second side 11b of the antenna coil. In this case, the magnetic sheet 20 is arranged on the surface of the antenna device 1 that opposes to the reader/writer 120. As illustrated in FIG. 4C, magnetic flux gathered in the end portion 3a of the metallic foil 3 is introduced from an end portion 20a of the magnetic sheet 20, and a current is induced in a portion of the antenna coil that is located on the second side 11b of the antenna device 1.

Figure 5A:
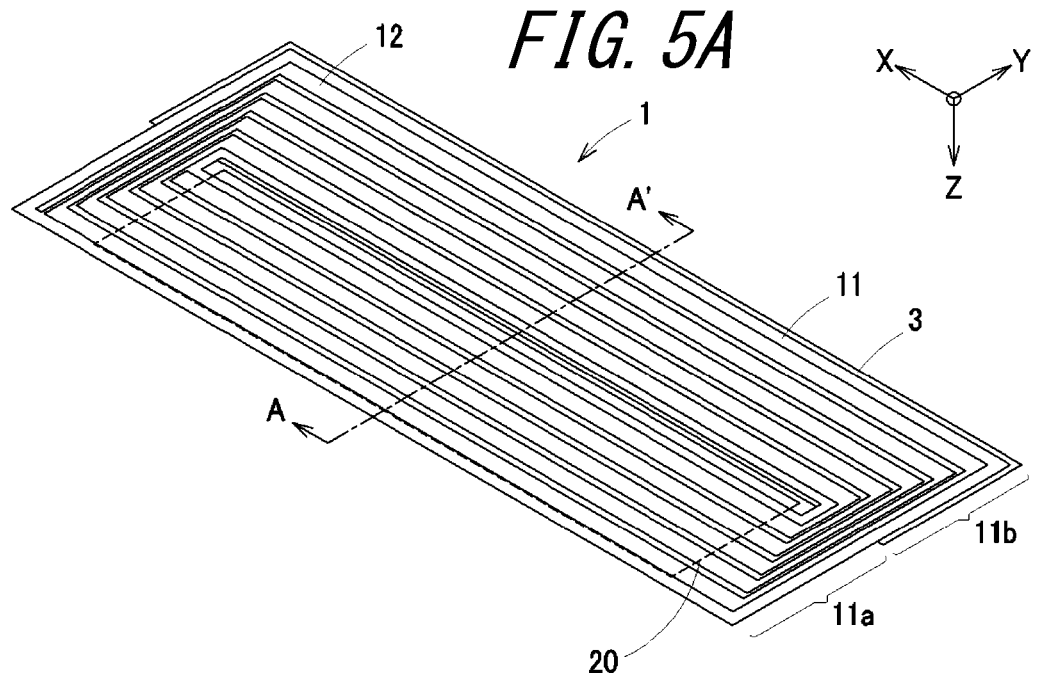
FIGS. 5A to 5C illustrate an exemplary configuration of an antenna device according to another modification of the embodiment of the present disclosure.
Figure 5B:
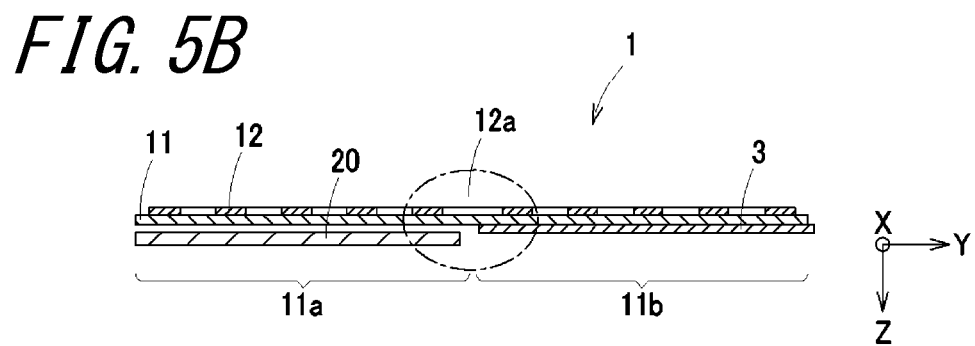

As illustrated in FIGS. 5A and 5B, the antenna device 1 includes the antenna coil 12 embedded in the housing of the electronic equipment and configured to communicate with the reader/writer 120 that is inductively coupled to the antenna device 1, the antenna substrate 11 on which the antenna coil 12 is mounted, and the communication processing unit 13 configured to be driven by power generated by the antenna coil 12. On a surface of the antenna substrate 11 that is opposite to a surface thereof opposing to the reader/writer 120, the metal foil 3 is arranged to be superposed on a portion of the antenna coil 12. The material of the antenna substrate 11, the method of forming the antenna coil, and the material and the method of forming the metallic foil are the same as those in the case of FIG. 2 described above.

Figure 5C:
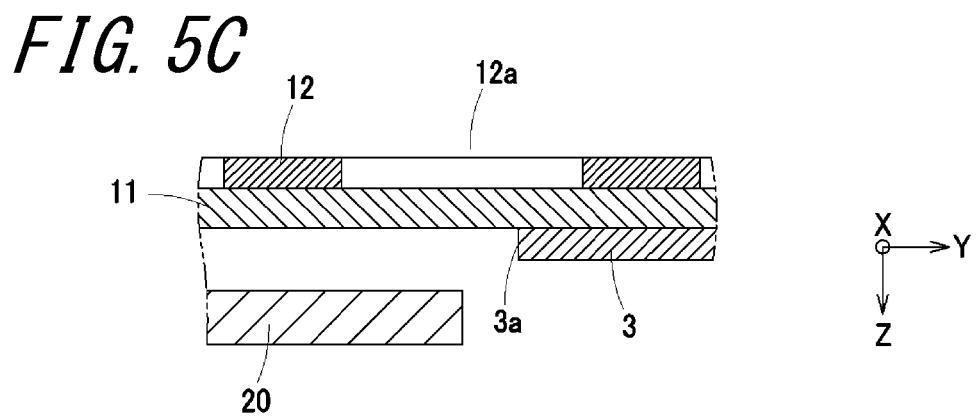

The antenna device 1 further includes the rectangular magnetic sheet 20 superposed on the antenna coil 12, and the magnetic sheet 20 in the present modification is arranged only on the first side 11a of the antenna coil. In this case, the magnetic sheet 20 is arranged on the surface of the antenna device 1 that is opposite to the surface thereof opposing to the reader/writer 120. As illustrated in FIG. 5C, magnetic flux gathered in the end portion 3a of the metallic foil 3 is introduced from the end portion 20a of the magnetic sheet 20, and a current is induced in a portion of the antenna coil that is located on the first side 11a of the antenna device 1.

[Modification 2]

In the antenna device 1, the metallic foil 3 is formed to cover only a portion of the antenna coil 12 that is located on the second side 11b of the antenna substrate 11. Generally, numerous metallic internal structures that shield magnetic flux are present in the housing of the electronic equipment 50. Accordingly, by locating the metallic foil 3 in adjacent to, or to be superposed on, these internal structures, a channel for shielding magnetic flux is formed. Magnetic flux gathered in the end portion 3a of the metallic foil 3 only needs to be introduced to the magnetic sheet 20 by utilizing the channel. The above configuration merely utilizes the metallic internal structures equipped in the housing as the channel for guiding magnetic flux and does not always arrange the internal structures in such a manner to form the channel more efficiently. One way to address the above is to allow the metallic foil 3 included in the antenna device 1 to have a greater area so that the metallic foil 3 actively supports the formation of the channel for shielding magnetic flux.

Figure 6A:
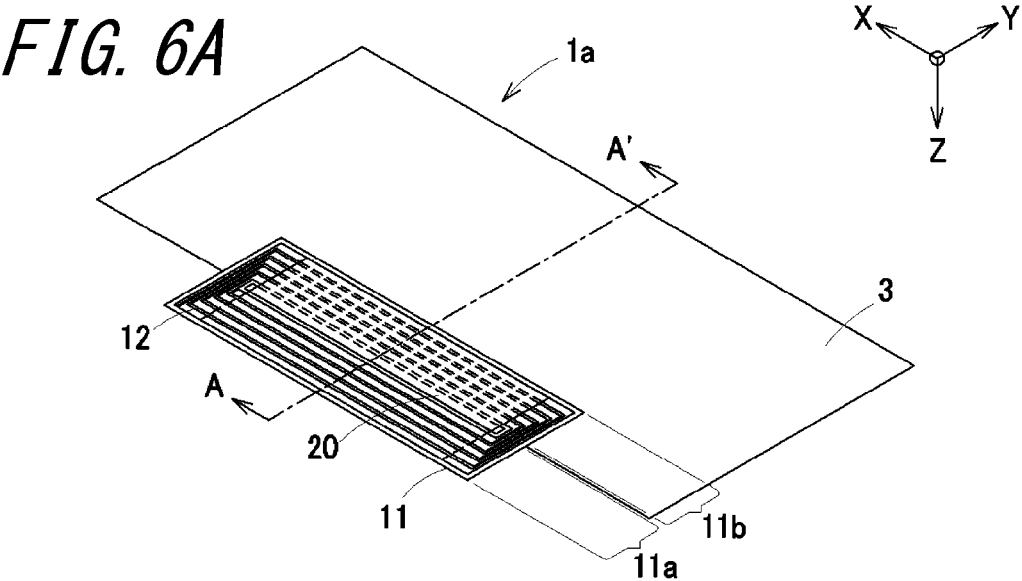
FIGS. 6A to 6C illustrate an exemplary configuration of an antenna device according to yet another modification of the embodiment of the present disclosure.
Figure 6B:
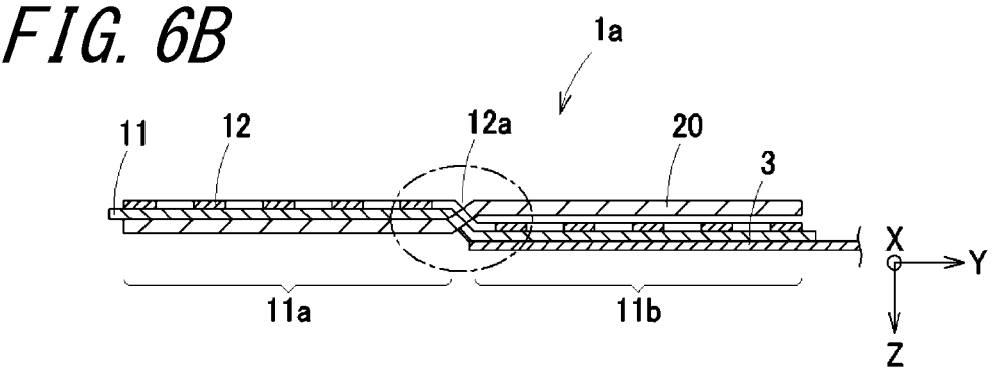
Figure 6C:
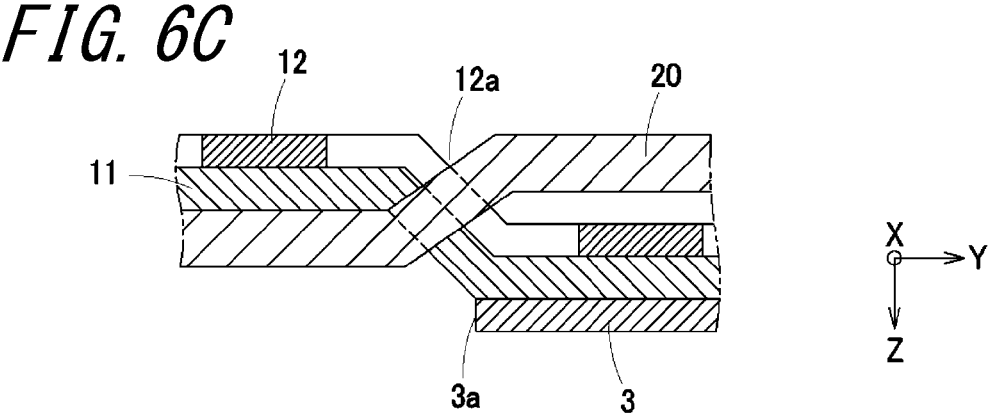

As illustrated in FIGS. 6A and 6B, in an antenna device 1a, the metallic foil 3 is arranged to be superposed on a portion of the antenna coil 12 that is located on the second side 11b of the antenna substrate 11. The metallic foil 3 has an area that is greater than an area of the portion of the antenna coil 12 located on the second side 11b of the antenna substrate 11 on which the metallic foil 3 is superposed. For example, an area of the antenna substrate 11 corresponding to the metallic foil 3 may be determined, and a Cu foil pattern may be formed on the surface of the entire area. Alternatively, foil of a metal, such as Al and Cu, may be attached by using an adhesive or a double-sided tape to be superposed on the portion of the antenna coil 12 that is located on the second side 11b of the antenna substrate 11. Needless to say, the area and the shape of the metallic foil 3 may be determined freely in accordance with the configuration inside the housing. As illustrated in FIG. 6C, similarly to the above cases, the metallic foil 3 is arranged in a manner such that the end portion 3a is located in the vicinity of the central portion 12a of the antenna coil 12.

Figure 7A:
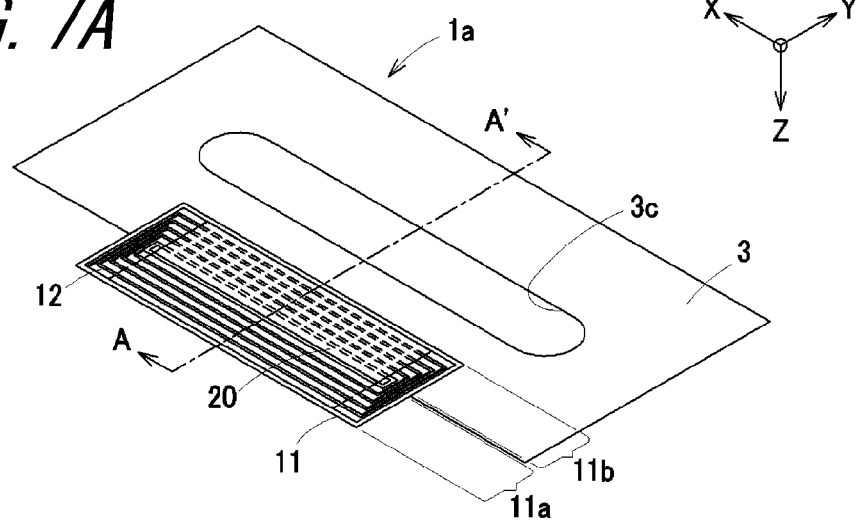
FIGS. 7A to 7C illustrate an antenna device according to yet another modification of the embodiment of the present disclosure with an aperture being provided in metallic foil.
Figure 7B:
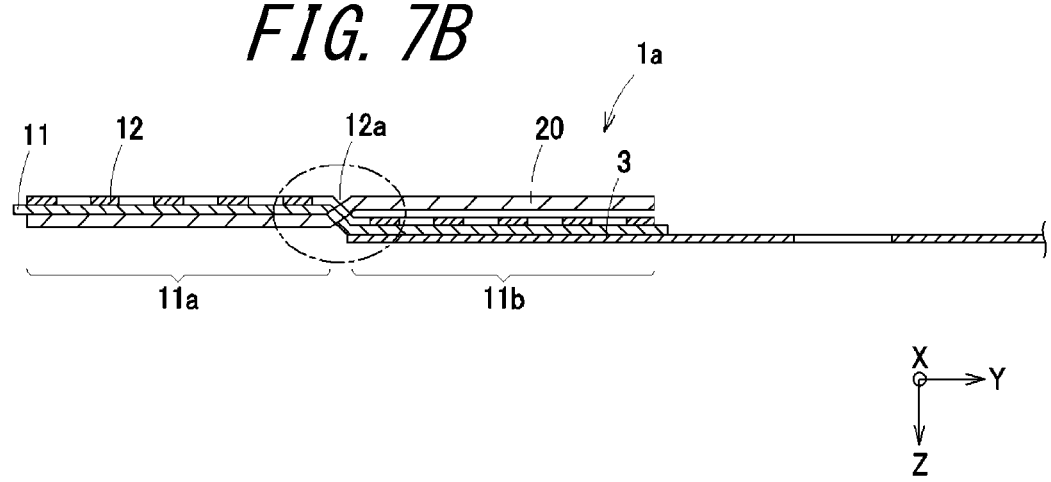
Figure 7C:
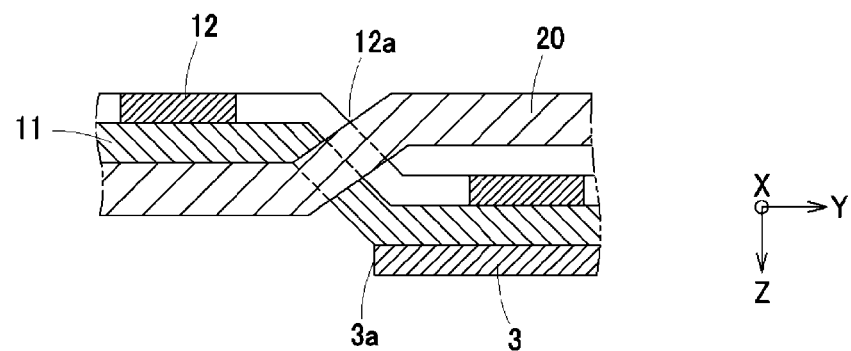

When the area of the metallic foil 3 is increased, the metallic foil 3 must not obstruct other internal structures. For example, assume that a camera module is arranged in a portion of the area in which the metallic foil 3 is arranged and that a lens barrel of the camera module is exposed to outside of the housing, as illustrated in FIGS. 7A and 7B, an aperture 3c needs to be formed in the corresponding portion of the metallic foil 3. Even in this case, as illustrated in FIG. 7C, the end portion 3a of the metallic foil 3 may be arranged in the vicinity of the central portion 12a of the antenna coil 12, and accordingly, magnetic flux emitted from the reader/writer 120 is gathered in the end portion 3a and introduced to the magnetic sheet 20.

Figure 8A:
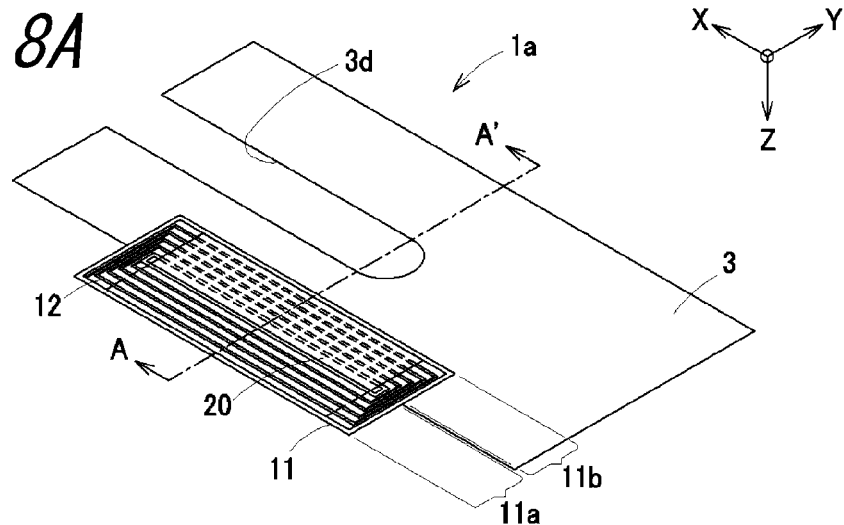
FIGS. 8A to 8C illustrate an antenna device according to yet another modification of the embodiment of the present disclosure with an aperture in the form of a cut-away being provided in metallic foil.
Figure 8B:
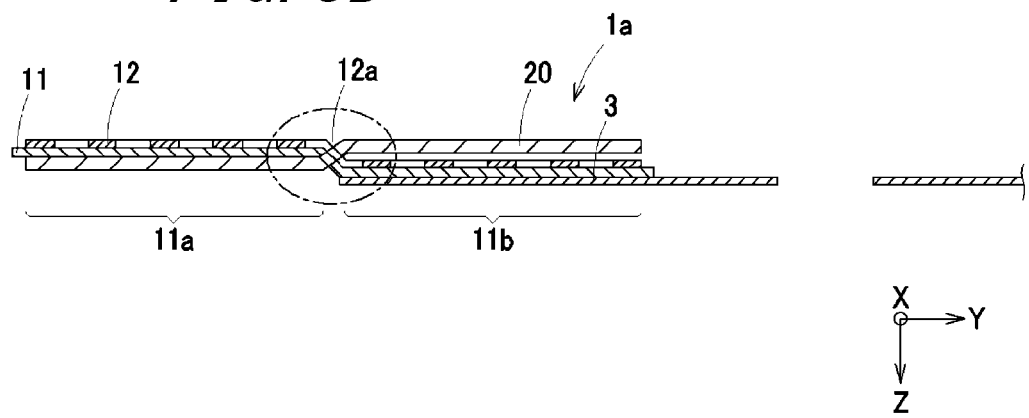
Figure 8C:
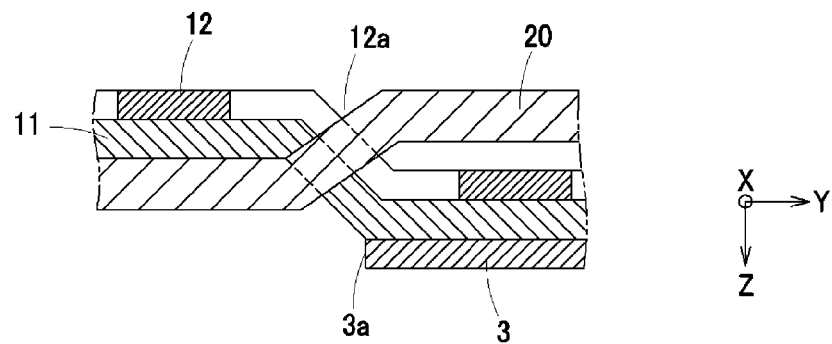

Furthermore, when the camera module is slidable and detachable in the x-axis direction, the aperture 3c may, as illustrated in FIGS. 8A to 8C, be extended to an edge to which the camera module is slidable, and thus, an aperture 3d in the form of a cut-away may be formed.

In the present modification, the magnetic sheet 20 may, of course, be arranged only on the second side 11b or on the first side 11a as in the cases illustrated in FIGS. 4A to 4C and FIGS. 5A to 5C.

[Modification 3]

The metallic foil 3 only needs to be superposed on the portion of the antenna coil 12 that is located on the second side 11b and may be formed on any surface of the antenna substrate 11.

Figure 9A:
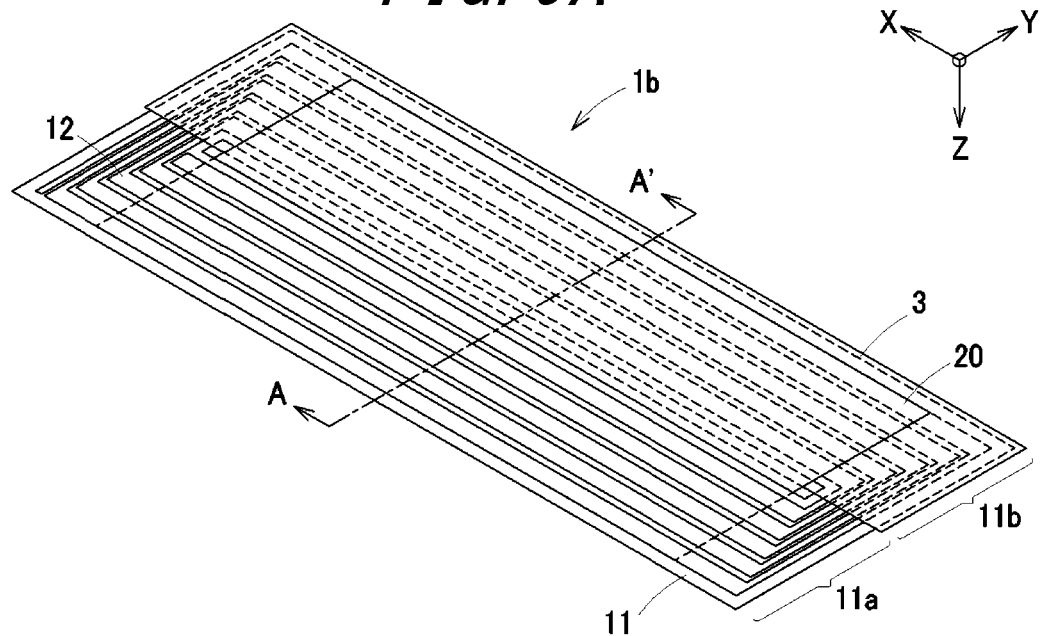
FIGS. 9A to 9C illustrate an antenna device according to yet another modification of the embodiment of the present disclosure.
Figure 9B:
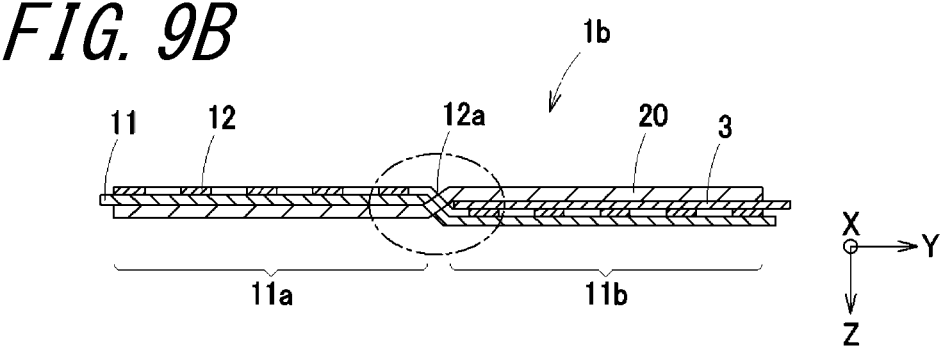

As illustrated in FIGS. 9A and 9B, an antenna device 1b includes the antenna substrate 11, the antenna coil 12 formed on a surface of the antenna substrate, and the metallic foil 3 formed to be superposed on a portion of the antenna coil 12.

Figure 9C:
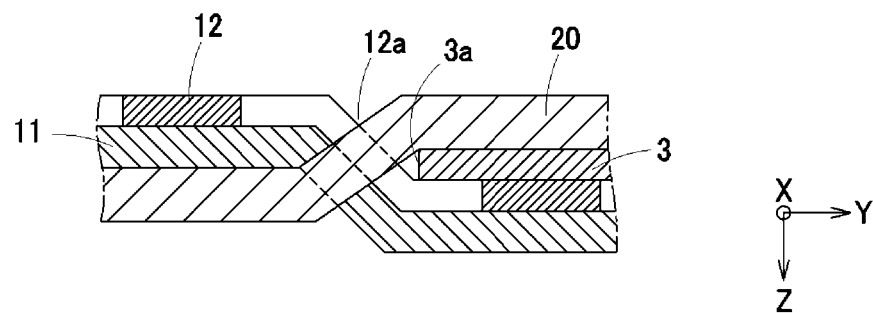

The antenna device 1b further includes the rectangular magnetic sheet 20 superposed on the antenna coil 12, and in the present modification a portion of the magnetic sheet 20 that is located on the first side 11a of the antenna coil is arranged on the surface that is opposite to the surface opposing to the reader/writer 120, and a portion of the magnetic sheet 20 that is located on the second side 11b of the antenna coil is arranged on the surface opposing to the reader/writer 120. The metallic foil 3 is formed between the magnetic sheet 20 and the antenna substrate 11 on the second side of the antenna coil 12. Even in this case, as illustrated in FIG. 9C, magnetic flux is gathered in the end portion 3a of the metallic foil 3, and the gathered magnetic flux is introduced to the magnetic sheet 20, similarly to the cases described above.

Furthermore, even when, as illustrated in FIG. 10A, the magnetic sheet 20 is arranged only on the second side 11b of the antenna coil 12, the metallic foil 3 may be formed between the magnetic sheet 20 and the antenna substrate 11, that is to say, on a surface of the antenna substrate 12 that opposes to the reader/writer 120. Moreover, even when, as illustrated in FIG. 10B, the magnetic sheet 20 is arranged only on the first side 11a of the antenna coil 12, the metallic foil 3 may be formed on a surface of the antenna substrate 12 that opposes to the reader/writer 120. Arranging position of the metallic foil 3 in the antenna substrate 12 may be in any of the forms illustrated in FIGS. 6A to 6C and FIGS. 8A to 8C or in any other form. Similarly to the cases described above, the metallic foil 3 may, of course, be arranged on a surface closer to the reader/writer 120 or be arranged on a surface away from the reader/writer 120. Needless to say, the dimension and the shape of the metallic foil may be determined freely as in the cases illustrated in FIGS. 6A to 6C and FIGS. 8A to 8C.

[Concrete Example 1]

The antenna device 1 according to one of embodiments of the present disclosure, in cooperation with the internal structures including metal that are present in the housing of the electronic equipment such as a mobile phone and a smartphone, guides and gathers magnetic flux (magnetic field) emitted from the reader/writer or the like to the end portion 3a of the metallic foil 3 included in the antenna device 1, thereby introducing the intensified magnetic field to the magnetic sheet 20 of the antenna device 1. This allows more intensified magnetic field to be introduced to the antenna device 1, and reliable communication characteristics are achieved.

Figure 11A:
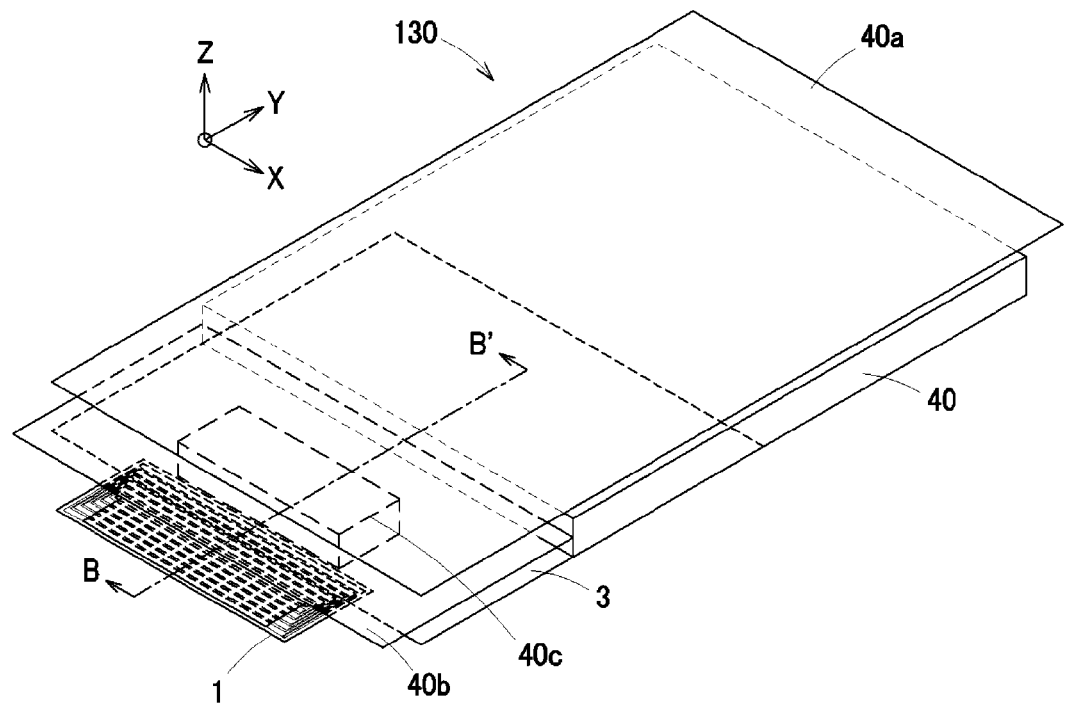
FIGS. 11A and 11B illustrate a state in which an antenna device according to one of embodiments of the present disclosure is mounted in electronic equipment (a smartphone)
Figure 11B:
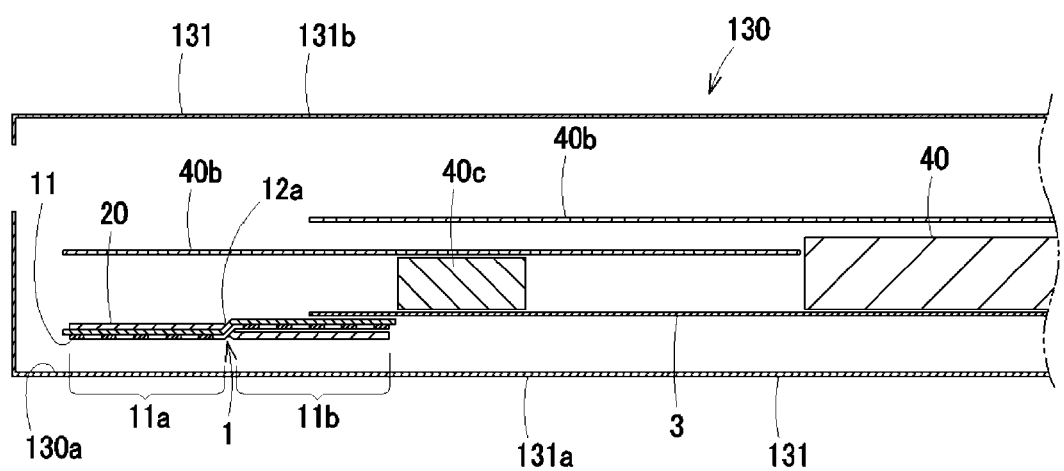

As illustrated in FIGS. 11A and 11B, the antenna device 1 may be used in a smartphone 130. The smartphone 130 includes a housing 131 including the first housing member 131a and the second housing member 131b. The first housing member 131a is equipped, on an inner surface 130a thereof, with the antenna substrate 11, and the second housing member 131b is equipped with a control circuit of a main body, including a liquid crystal panel, a CPU, or the like, the battery, and the like. The housing 131 is configured by connecting the first housing member 131a with the housing member 131b including the main body control circuit or the like in a manner such that the first housing member 131a is covered. The housing members 131a and 131b may be detachably connected to each other by a well-known method such as screw fastening, a pair of an engagement claw and an engagement hole, or the like. The housing members 131a and 131b may also be secured by using an adhesive or the like. The housing member 131a may also be equipped in advance with one or more functional modules, such as a camera module, alone or in combination, in addition to the antenna substrate 11. When the housing member 131a equipped with the functional modules such as the antenna substrate 11 is detachable, a user of the smartphone 130 may detach the housing member 131a from the housing member 131b and attach another housing member equipped with other functional modules.

The housing member 131a, which serves as a cover, is equipped in advance with the antenna substrate 11, and the antenna substrate 11 is arranged in such a manner that a surface thereof formed with the antenna coil 12 opposes to the reader/writer 120 via the housing member 131a. Preferably, the antenna substrate 11 is arranged in the vicinity of an outer circumferential wall of the housing member 131a, preferably with the first side 11a of the antenna substrate 11 sticking to the outer circumferential side and with the second side of the antenna substrate 11 sticking to the central side. The second housing member 131b is equipped, for example, with a control substrate 40 configured to control the smartphone, a battery 40 arranged on the control substrate 40, an RF communication module 40c configured to wirelessly communicate with a base station or the like, and an RF substrate 40b on which the RF communication module 40c is arranged. The substrate and others are internal structures equipped in the housing 131. Since containing metal, the internal structures provide the effect of shielding magnetic flux. To improve the shielding effect for guiding and gathering magnetic flux to the end portion 3a of the metallic foil 3 included in the antenna device 1, additional metallic foil 40d may be arranged to be superposed on at least a portion of the metallic foil 3 included in the antenna device.

[Concrete Example 2]

Instead of using the additional metallic foil 40d described with respect to the concrete example 1, the antenna device 1a according to a modification of the embodiment of the present disclosure may also be used.

Figure 12A:
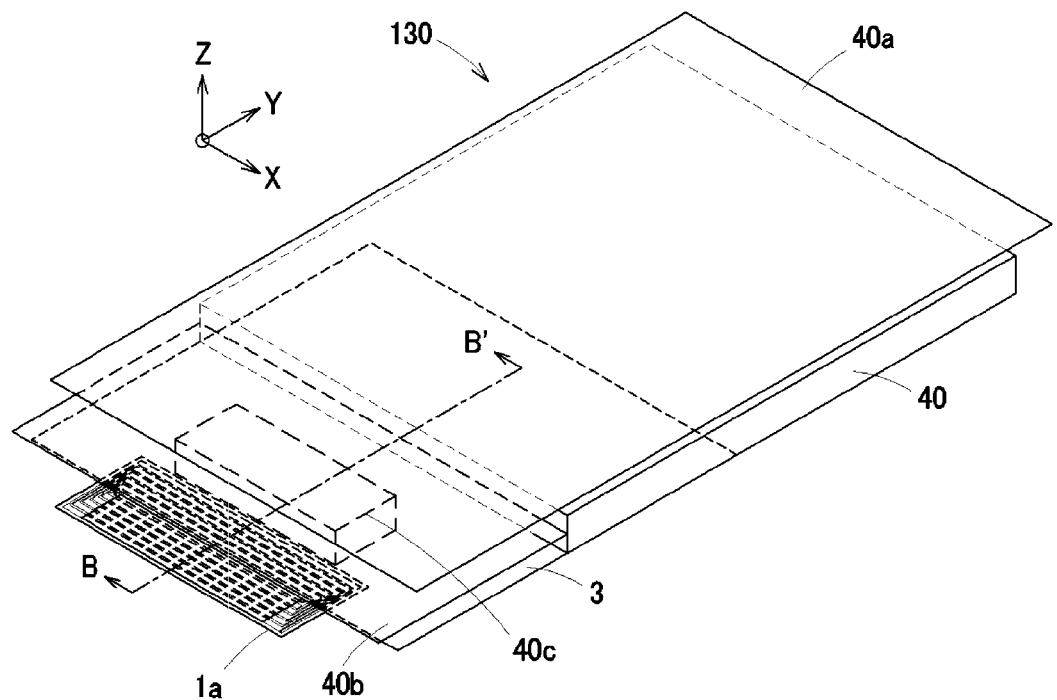
FIGS. 12A and 12B illustrate a state in which an antenna device according to a modification of the embodiment of the present disclosure is mounted in electronic equipment (a smartphone)
Figure 12B:
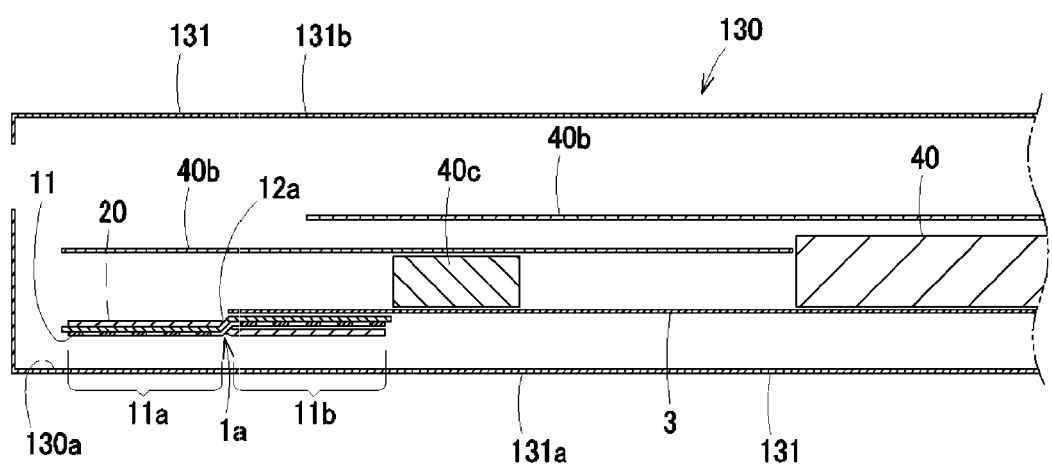

As illustrated in FIGS. 12A and 12B, the antenna device 1a may be arranged on the inner surface of the first housing member 131a included in the smartphone 130. In the antenna device 1a, the metallic foil 3 superposed on the second side 11b of the antenna coil 12 may have an area that is greater than an area of the second side 11b on which the metallic foil 3 is superposed, and thus, the metallic foil 3 may be configured to cover most of the inner surface of the housing member 131a.

[Concrete Example 3]

Figure 13A:
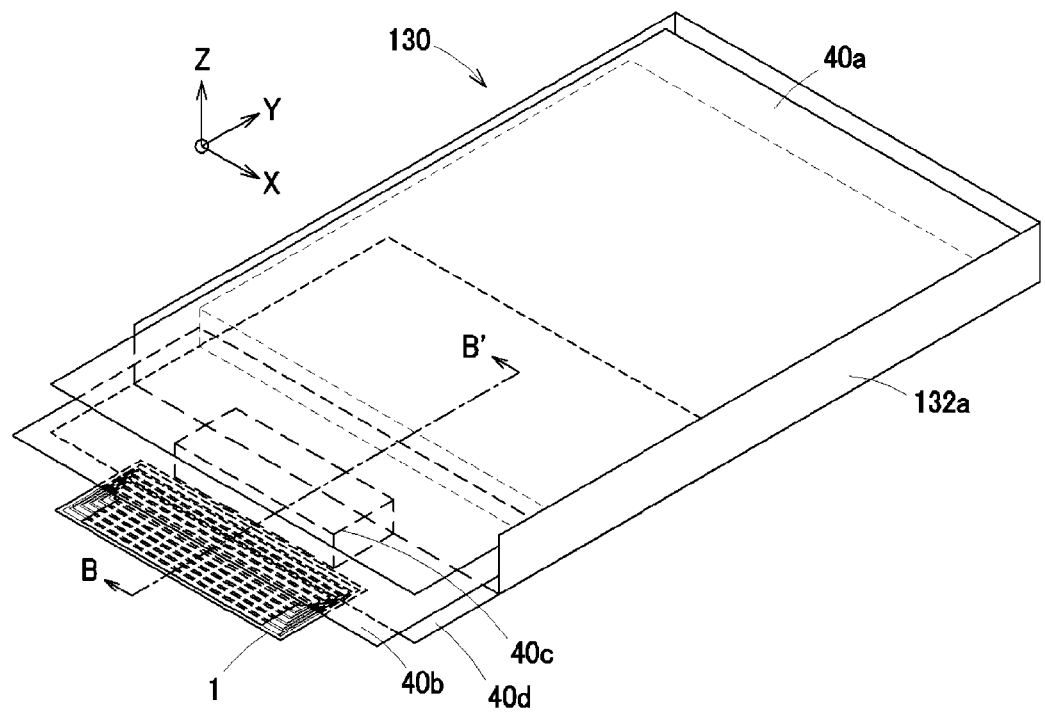
FIGS. 13A and 13B illustrate a state in which an antenna device according to one of embodiments of the present disclosure is mounted in electronic equipment (a smartphone) including a metallic casing.
Figure 13B:
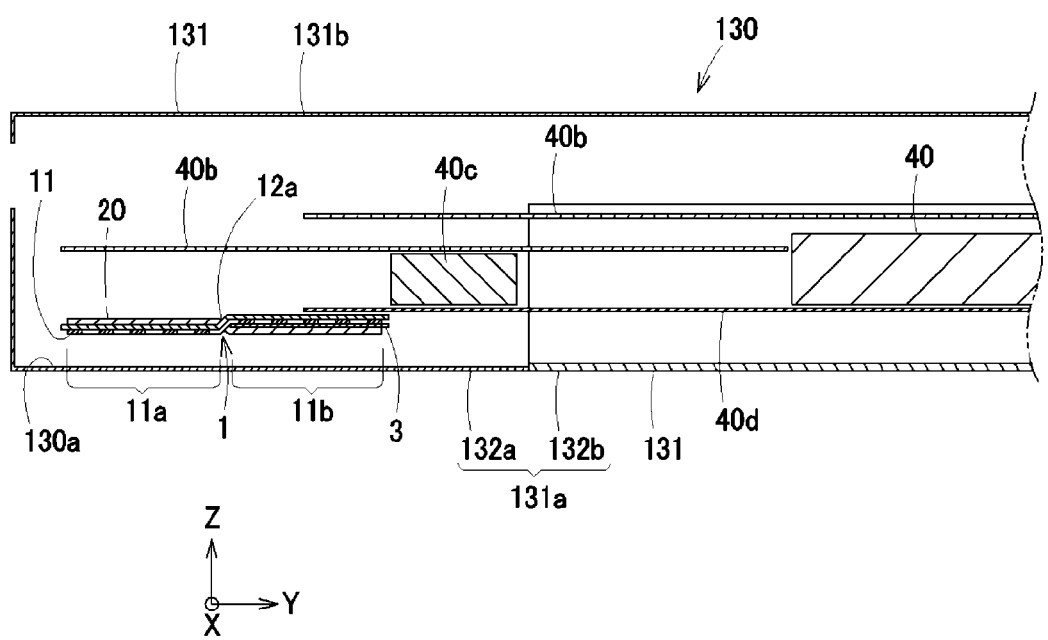

The housing member 131a included in the smartphone 130 is more often formed by a composite material of a metal material, such as a magnesium alloy, mixed with a resin material than before with a view to compensating for lack of strength due to a design approach aiming at aesthetic appearance of the electronic equipment per se or thinning of the housing. That is to say, the housing member 131a includes a metal cover 132a made of a metal material and a resin portion 132b made of a resin material. As illustrated in FIGS. 13A and 13B, the antenna device 1 is arranged in the resin portion 132b included in the housing member 131a. The metallic foil 3 included in the antenna device 1, together with the substrate 40b, the RF module 40c, a substrate 40a, and the metal cover 132a, forms a metallic shield against magnetic flux. Magnetic flux emitted from the reader/writer 120 flows while avoiding these metals and gathers in the vicinity of the end portion 3a of the metallic foil 3 included in the antenna device 1, and the magnetic field is intensified. To make the effect of shielding magnetic flux further effective, additional metallic foil 40d may also be added. Instead of the additional metallic foil 40d, the antenna device 1a according to the aforementioned modification 2 may also be used.

[Concrete Example 4]

A tablet PC 135 as the electronic equipment includes a housing 136 and a liquid crystal panel 138 mounted in front of the housing 136. The antenna device 1a (according to the modification 2) is arranged in a peripheral portion of the liquid crystal panel 138. The reader/writer 120 emits magnetic field from a surface thereof that opposes to the liquid crystal panel 138.

Figure 14A:
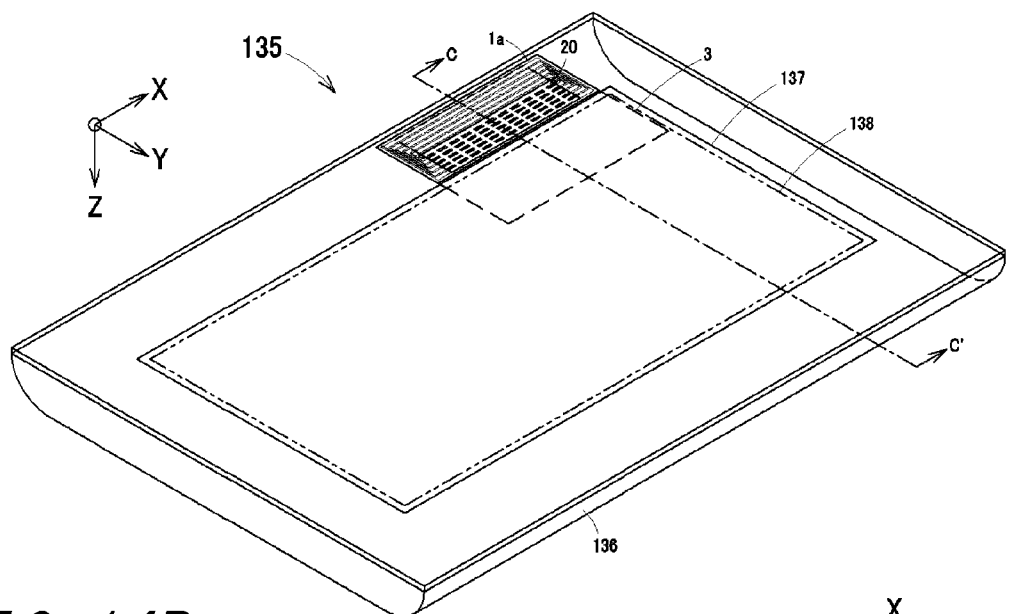
FIGS. 14A to 14C illustrate a state in which an antenna device according to a modification of the embodiment of the present disclosure is mounted in electronic equipment (a tablet PC)
Figure 14B:
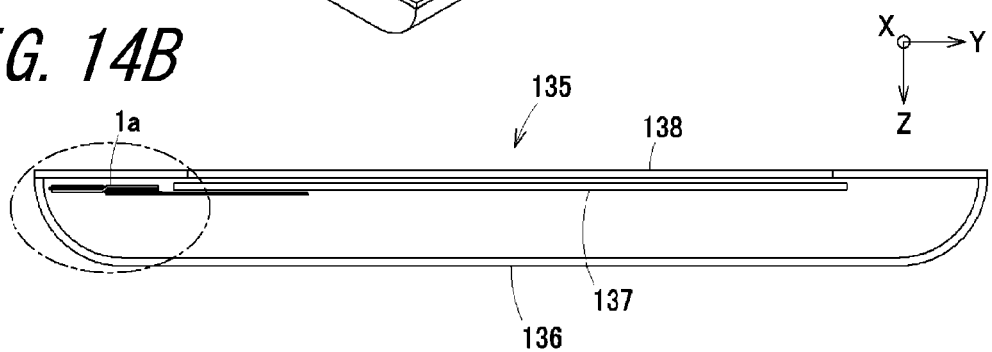
Figure 14C:
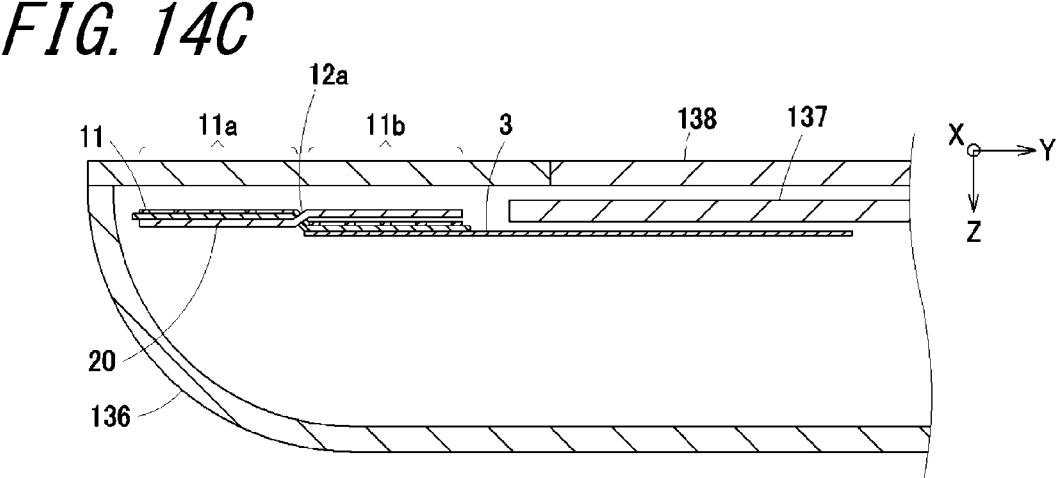

As illustrated in FIGS. 14A to 14C, behind the liquid crystal panel 138 mounted in the tablet PC 135, a metallic chassis 137 is arranged on an inner side of the housing 136. The chassis 137 is superposed on the metallic foil 3 included in the antenna device 1a, and accordingly, magnetic flux is shielded to be gathered in the end portion 3a of the metallic foil 3. Liquid crystal-loaded equipment including the tablet PC 135 has a panel frame portion in the peripheral portion of the liquid crystal display portion, which is advantageous in gathering the magnetic field. The chassis 137 may be superposed on the metallic foil 3 very easily, for example, by simply attaching the chassis 137 by an adhesive or the like.

[Concrete Example 5]

The housing 136 included in the tablet PC 135 is sometimes formed by a metal cover 136a made of a metal material and a resin portion 132b made of a resin material. In this case, the metal cover 136a may also be used to form a channel for shielding magnetic flux, and the metallic foil 3 of the antenna device 1a is arranged to be superposed on an inner surface of the metal cover 136a.

Figure 15A:
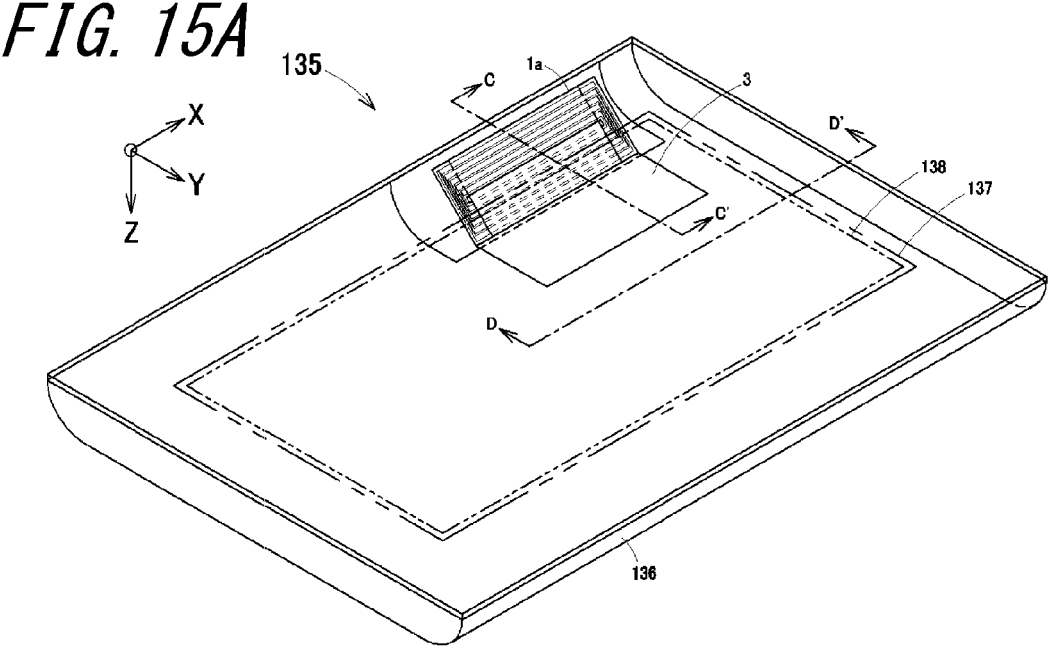
FIGS. 15A to 15C illustrate a state in which an antenna device according to one of embodiments of the present disclosure is mounted in electronic equipment (a tablet PC)
Figure 15B:
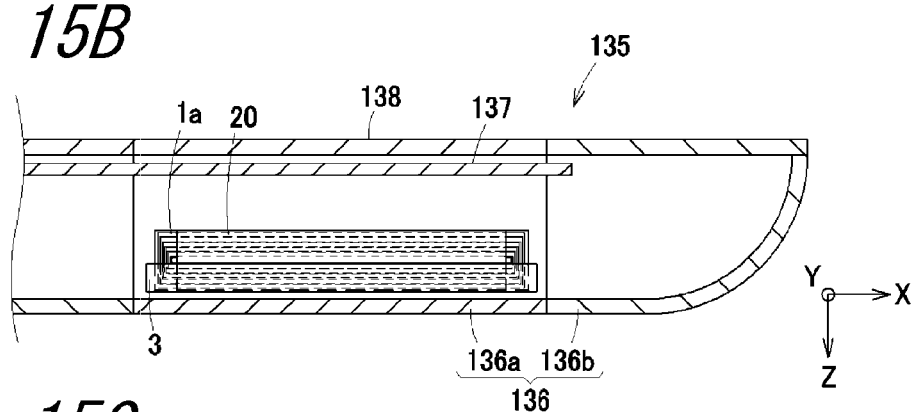
Figure 15C:
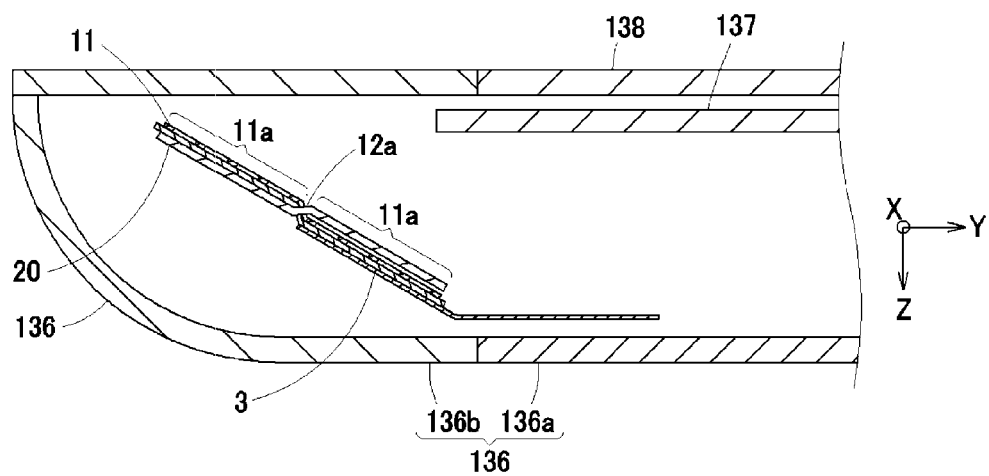

As illustrated in FIGS. 15A to 15C, the metallic foil 3 may be arranged to form an angle with respect to the metal cover 136a in accordance with a curved surface of the housing 136, to be pointed toward a direction in which magnetic field progresses.

Needless to say, the above concrete examples are merely illustrative of the embodiments, and the aforementioned modifications may be adopted.

EXAMPLES

The following describes Examples of the antenna device 1 according to the present disclosure in comparison with a conventional antenna device in which no metallic foil 3 is used in terms of the effect of the metallic foil 3 to shield magnetic flux.

Comparative Example

Figure 16A:
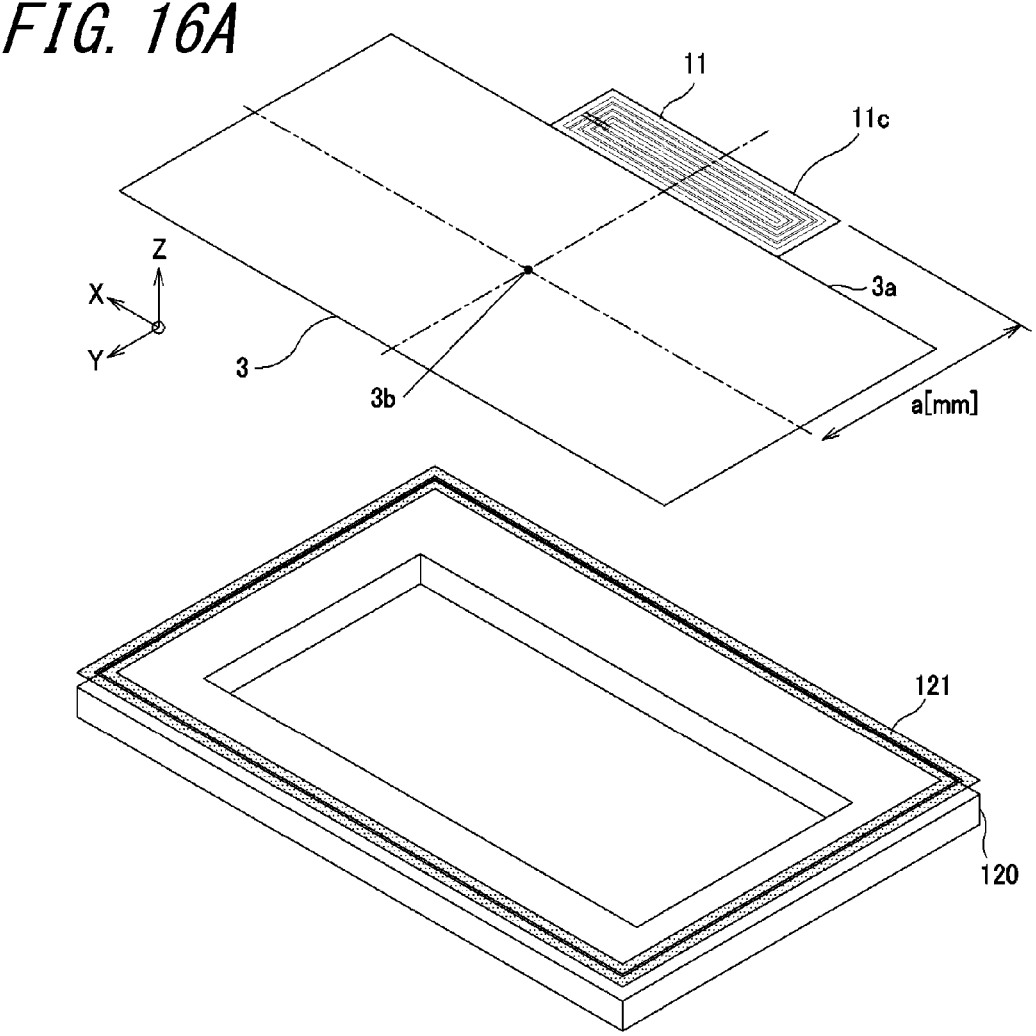
FIG. 16A is a perspective view illustrating an antenna device according to Comparative Example.
Figure 16B:
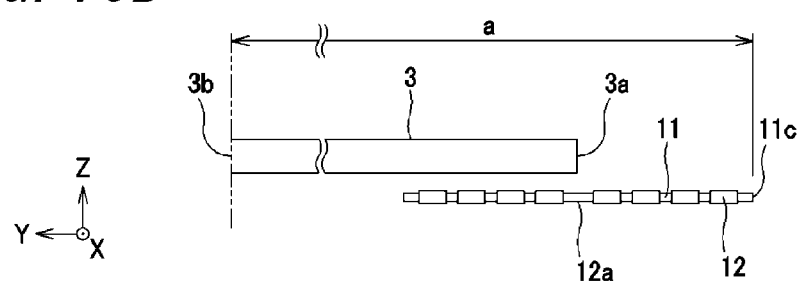
FIG. 16B is a sectional view in the vicinity of the antenna device.

For the antenna device according to Comparative Example, the metallic plate 4 was opposed to the reader/writer 120 as illustrated in FIG. 16, and communication characteristics in response to a change in a relative positional relation between the metallic plate 4 and the antenna substrate 11 were assessed.

Detailed assessment conditions were as follows. That is to say, as the antenna 121 included in the reader/writer 120, a dual wound coil having an outer dimension defined in the x-y direction of 66 mm×100 mm was used. As the metallic plate 4, stainless having a dimension defined in the x-y-z direction of 100 mm×50 mm×0.3 mm was used. As the antenna coil 12 included in the antenna substrate 11, a quad wound coil having an outer dimension defined in the x-y direction of 40 mm×10 mm was used. Furthermore, a distance defined in the z-axis direction from a surface of the metallic plate 4 to the antenna coil 12 was set to be 1 mm.

Herein, the following parameter a was used to denote the relative positional relation between the metallic plate 4 and the antenna substrate 11. That is to say, parameter a denotes the distance defined in the y-axis direction from the center 4b of the metallic plate 4 to an end portion 11c of the second side 11b of the antenna substrate 11.

Under the above conditions, simulation was performed to determine a coupling coefficient of the antenna coil 12 when the value of a was changed from 15 mm to 40 mm. Changes in the coupling coefficient are shown in FIG. 17.

Herein, the metallic plate 4 has a width of 50 mm, and therefore, when the value of a is 25 mm, an end portion 4a of the metallic plate 4 coincides with the end portion 11c of the second side 11b of the antenna substrate 11. The antenna substrate 11 has a width of 10 mm, and therefore, when the value of a is 35 mm, an end portion 11d of the first side 11a of the antenna substrate 11 coincides with the end portion 4a of the metallic plate 4.

Figure 17:
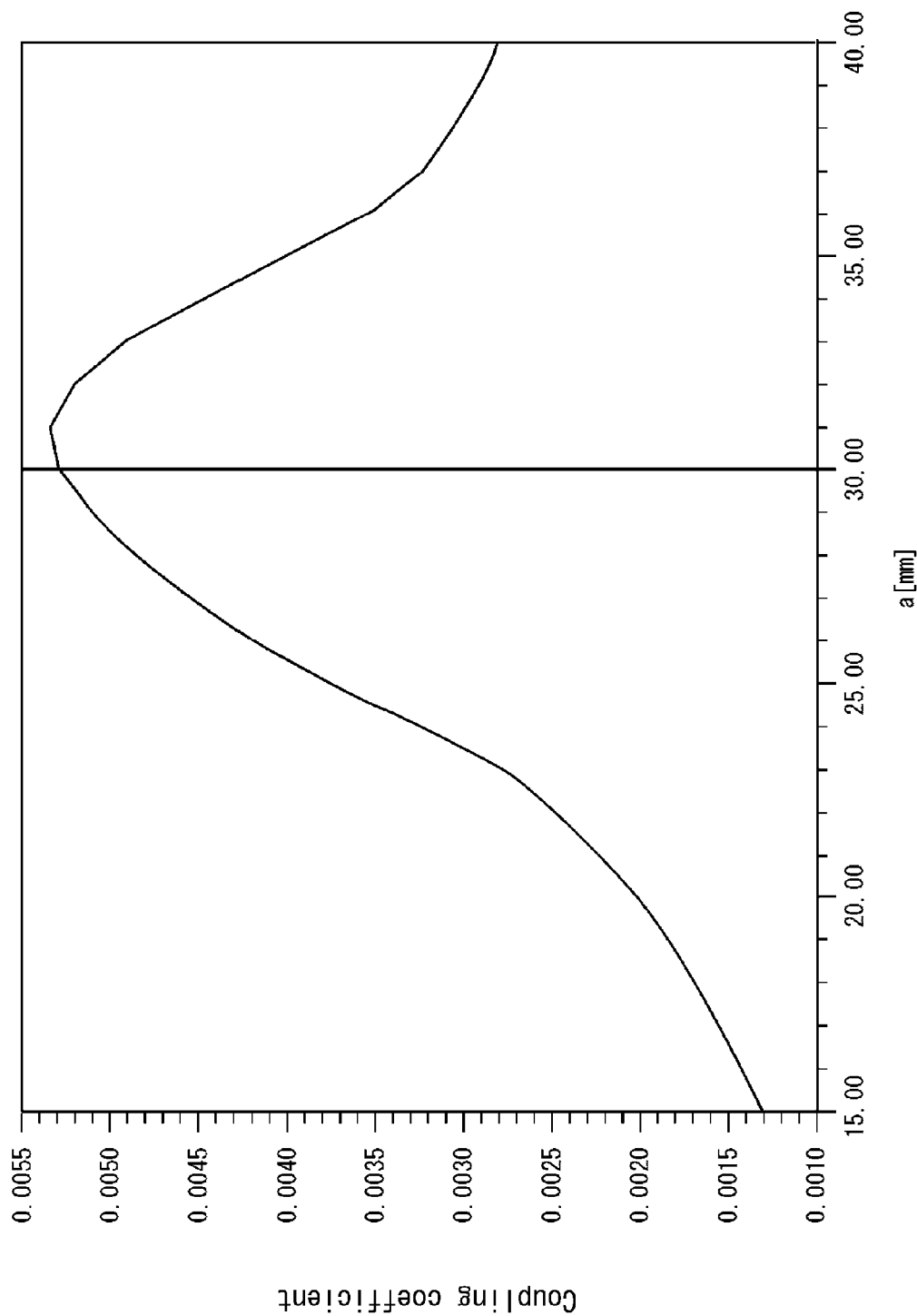
FIG. 17 is a graph illustrating changes in coupling coefficient according to Comparative Example.

As illustrated in FIG. 17, when the value of a is 30 mm, that is to say, when the center of the antenna substrate 11 in the widthwise direction substantially coincides with the end portion 4a of the metallic plate 4, the coupling coefficient is highest, and as the value of a is further away from 30 mm, the coupling coefficient decreases. Furthermore, the coupling coefficient exhibits substantially the same characteristics at values of a of 25 mm and 35 mm. The reason of the high coupling coefficient when the antenna coil 12 is arranged in the vicinity of the end portion 4a of the metallic plate 4 is that magnetic flux density is high on the periphery of the end portion 4a of the metallic plate 4. Another reason is that, in the metallic plate 4 generating an eddy current upon receiving a magnetic field emitted from the reader/writer 120, the intensity of the magnetic field is greater in the end portion 4a than in the center 4b, and magnetic energy received from the reader/writer 120 is efficiently transmitted to the antenna coil 12.

Additionally, both when a is changed to a value less than 25 mm and when a is changed to a value greater than 35 mm, the coupling coefficient decreases. However, the amount of decrease in coupling coefficient with respect to a change in the value a is less in the case of 35 mm or more. For example, the case of the value of a being 22 mm is compared with the case of the value of a being 38 mm. The coupling coefficient is higher by approximately 20% in the case of the value of a being 38 mm. Similarly, the case of the value of a being 20 mm is compared with the case of the value of a being 40 mm. The coupling coefficient is higher by approximately 40% in the case of the value of a being 40 mm.

Example

Figure 18A:
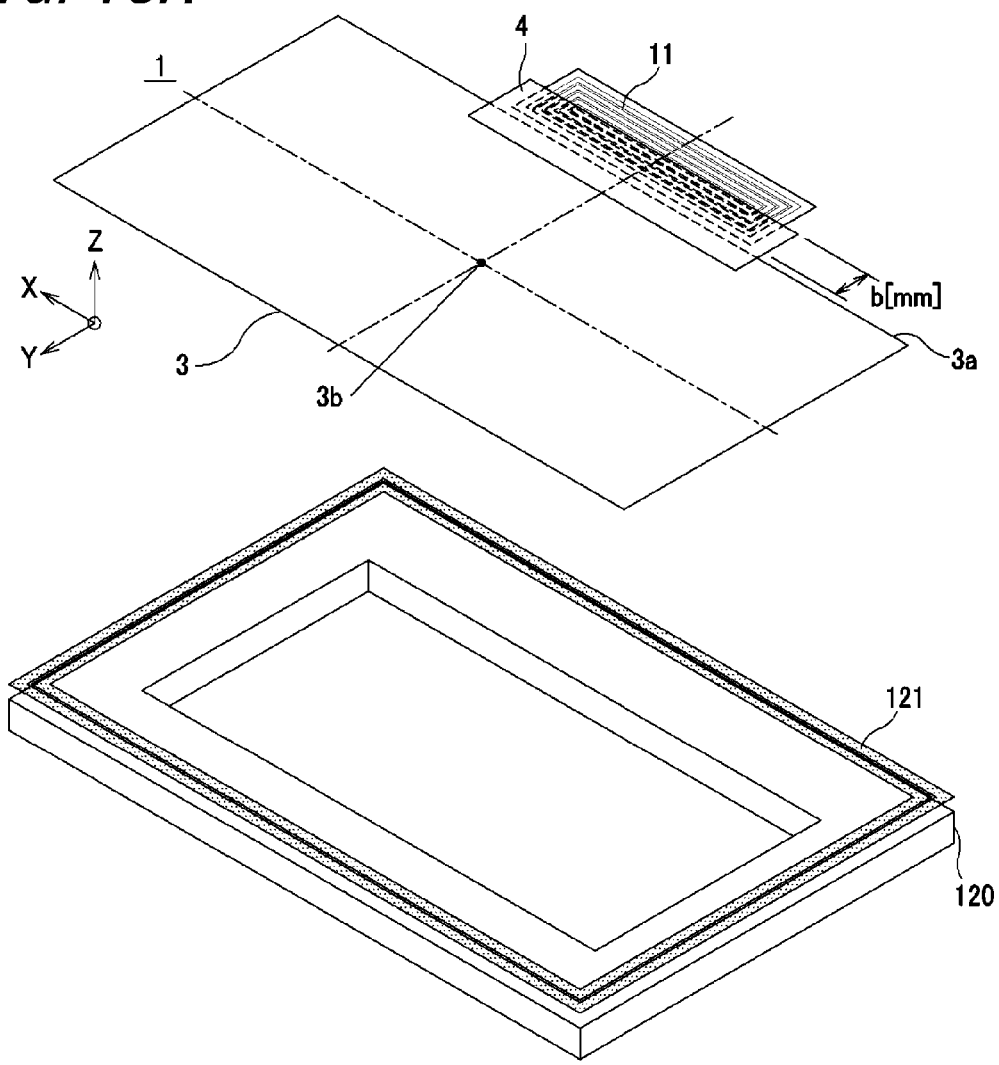
FIG. 18A is a perspective view illustrating an antenna device according to Example.
Figure 18B:
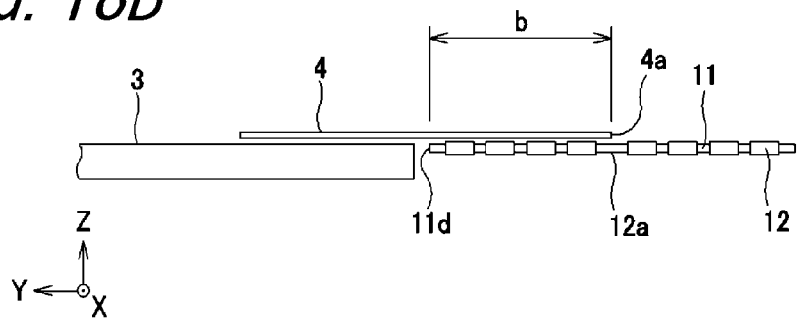
FIG. 18B is a sectional view in the vicinity of the antenna device.

In the present Example, as illustrated in FIG. 18, the metallic plate 4 was opposed to the reader/writer 120, and the metallic foil 3 was superposed on the metallic plate 4 and a surface of the antenna substrate 11 that faces away from the reader/writer 120. The antenna substrate 11 was arranged adjacent to the end portion 4a of the metallic plate 4. Communication characteristics in response to a change in relative positional relation between the metallic foil 3 and the antenna substrate 11 were assessed in the above conditions.

Detailed assessment conditions are the same as those in Comparative Example as far as the outer dimensions, configurations, and arrangement of the reader/writer 120, the antenna 121, the metallic plate 4, the antenna substrate 11, and the antenna coil 12 are concerned. As the metallic foil 3, copper foil having an outer dimension of 50 mm×10 mm was used. The copper foil was superposed over the entire width of the antenna substrate 11 in the longitudinal direction.

Herein, the following parameter b was used to denote the relative positional relation between the antenna substrate 11 and the metallic foil 3 superposed on the antenna substrate 11. That is to say, the parameter b denotes a superposed distance defined in the y-axis direction from the end portion 11d of the first side 11a of the antenna substrate 11 to the end portion 3a of the metallic foil 3 that is located closer to the antenna substrate 11.

Under the above conditions, simulation was performed to obtain the coupling coefficient of the antenna coil 12 when the value of b was changed from 0 mm to 10 mm. Changes in the coupling coefficient are shown in FIG. 19.

Since the antenna substrate 11 has a width of 10 mm, when the value of b is 5 mm, the metallic foil 3 is superposed over the entire first side 11a via the central portion 12a of the antenna coil 12. When the value of b is 0 mm, the metallic foil 3 is not superposed on the antenna substrate 11 at all, and when the value of b is 10 mm, the metallic foil 3 is superposed over the entire antenna substrate 11.

Figure 19:
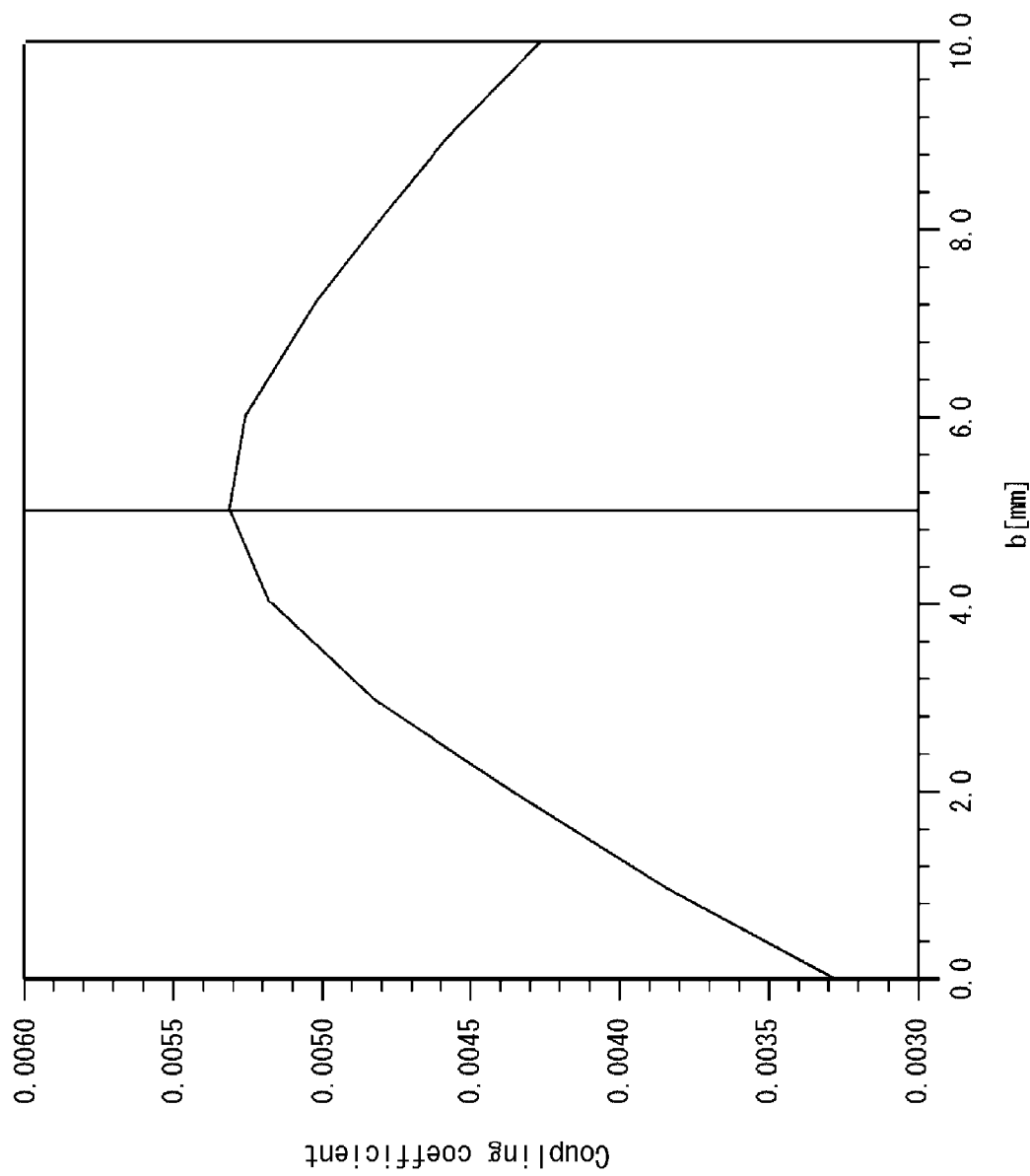
FIG. 19 is a graph illustrating changes in coupling coefficient according to Example.

As illustrated in FIG. 19, when the value of b is 5 mm, that is to say, when the metallic foil 3 is superposed over the entire first side 11a of the antenna substrate 11 via the central portion 12a of the antenna coil 12, the coupling coefficient is highest, and the value (of the coupling coefficient: 0.0053) at this time is equivalent to the coupling coefficient obtained in the antenna device according to Comparative Example.

Thus, with the metallic foil 3 being superposed on the metallic plate 4 and the antenna substrate 11, the antenna device 1 is capable of reducing inductive coupling by distracting magnetic field in the superposed region and efficiently transmitting a current generated in a non-superposed region and is also capable of guiding, in a leak-tight manner, magnetic flux from the metallic plate 4 to a region of the antenna substrate 11 in which the metallic foil 3 is not superposed and allowing efficient inductive coupling. Consequently, flexibility in arrangement of the antenna substrate 11 with respect to the metallic plate 4 is improved, while the coupling coefficient that is equivalent to the coupling coefficient obtained in the antenna device according to Comparative Example is achieved.

REFERENCE SIGNS LIST 1 antenna device
3 metallic foil
3a end portion
4 metallic plate
4a end portion
4b central portion
11 antenna substrate
11a first side
11b second side
12 antenna coil
12a central portion
13 communication processing unit
14 terminal portion
20 magnetic sheet
40 battery
40a, 40b substrate
40c RF module
40d metallic foil
50 electronic equipment
120 reader/writer
121 antenna
130 smartphone
131 housing
131a, 131b housing member
132a metal cover
132b resin portion
135 tablet PC
136 housing
137 chassis of liquid panel
138 liquid crystal panel body

The invention claimed is:

1. An antenna device that is used in an electronic equipment and that is configured to communicate with external equipment through an electromagnetic signal, the antenna device comprising:
   an antenna substrate which is arranged on an inner surface of a housing member constituting a housing of the electronic equipment and around which an antenna coil, which is configured to be inductively coupled to the external equipment, is wound;
   a conductive body in the form of a sheet that is arranged on the antenna substrate to be superposed on a portion of the antenna coil; and
   a magnetic sheet that is arranged to be superposed on at least a portion of the antenna coil and that is configured to attract a magnetic field emitted from the external equipment to the antenna coil, wherein
   on a first side of the antenna coil in which a current flowing through wiring of the antenna coil is carried in one direction, the antenna coil is closer to the external equipment than the magnetic sheet is, and/or, on a second side of the antenna coil in which the current flowing through the wiring of the antenna coil is carried in another direction that is opposite to the one direction, the magnetic sheet is closer to the external equipment than the antenna coil and the conductive body are,
   the conductive body is superposed only on the second side of the antenna coil, and
   the first side of the antenna coil is located on the peripheral side in the housing member, and the second side of the antenna coil is located on the central side in the housing member.

2. The antenna device of claim 1, wherein the conductive body is wider than an entire width of the first side of the antenna coil, and the conductive body has an area that is greater than an area of the portion of the antenna coil on which the conductive body is superposed.

3. The antenna device of claim 2, wherein an aperture is provided in at least one location in a portion of the conductive body that is not superposed on the antenna substrate.

4. The antenna device of claim 3, wherein the aperture is in the form of a cut-away.

5. The antenna device of claim 1, wherein the second side of the antenna coil is closer to the external equipment than the conductive body is.

6. The antenna device of claim 1, wherein the conductive body is closer to the external equipment than the antenna coil is.

7. The antenna device of claim 1, wherein the antenna coil and the conductive body comprise a conductive layer formed on the antenna substrate.

8. An antenna device that is used in an electronic equipment and that communicates with external equipment through an electromagnetic signal, the antenna device comprising:
   a housing member constituting a housing of the electronic equipment;
   an antenna substrate which is arranged on an inner surface of the housing member and around which an antenna coil, which is configured to be inductively coupled to the external equipment, is wound;
   a conductive body in the form of a sheet that is arranged on the antenna substrate to be superposed on a portion of the antenna coil; and a magnetic sheet that is arranged to be superposed on at least a portion of the antenna coil and that is configured to attract a magnetic field emitted from the external equipment to the antenna coil, wherein on a first side of the antenna coil in which a current flowing through wiring of the antenna coil is carried in one direction, the antenna coil is closer to the external equipment than the magnetic sheet is, and/or, on a second side of the antenna coil in which the current flowing through the wiring of the antenna coil is carried in another direction that is opposite to the one direction, the magnetic sheet is closer to the external equipment than the antenna coil and the conductive body are, the conductive body is superposed only on the second side of the antenna coil, and the first side of the antenna coil is located on the peripheral side in the housing member, and the second side of the antenna coil is located on the central side in the housing member.

9. The antenna device of claim 8, wherein the conductive body is wider than an entire width of the first side of the antenna coil, and the conductive body has an area that is greater than an area of the portion of the antenna coil on which the conductive body is superposed.

10. The antenna device of claim 9, wherein an aperture is provided in at least one location in a portion of the conductive body that is not superposed on the antenna substrate.

11. The antenna device of claim 10, wherein the aperture is in the form of a cut-away.

12. The antenna device of claim 8, wherein the second side of the antenna coil is closer to the external equipment than the conductive body is.

13. The antenna device of claim 8, wherein the conductive body is closer to the external equipment than the antenna coil is.

14. The antenna device of claim 8, wherein the antenna coil and the conductive body comprise a conductive layer formed on the antenna substrate.

15. The antenna device of claim 8, wherein
the housing member includes a metal portion as a component thereof, and
the conductive body is superposed on a portion of the metal portion.

16. Electronic equipment including an antenna device configured to communicate with external equipment through an electromagnetic signal, the antenna device comprising:
an antenna substrate which is arranged on an inner surface of a housing member constituting a housing of the electronic equipment and around which an antenna coil, which is configured to be inductively coupled to the external equipment, is wound;
a conductive body in the form of a sheet that is arranged on the antenna substrate to be superposed on a portion of the antenna coil; and
a magnetic sheet that is arranged to be superposed on at least a portion of the antenna coil and that is configured to attract a magnetic field emitted from the external equipment to the antenna coil, wherein on a first side of the antenna coil in which a current flowing through wiring of the antenna coil is carried in one direction, the antenna coil is closer to the external equipment than the magnetic sheet is, and/or, on a second side of the antenna coil in which the current flowing through the wiring of the antenna coil is carried in another direction that is opposite to the one direction, the magnetic sheet is closer to the external equipment than the antenna coil and the conductive body are, the conductive body is superposed only on the second side of the antenna coil, and the first side of the antenna coil is located on the peripheral side in the housing member, and the second side of the antenna coil is located on the central side in the housing member.

17. Electronic equipment including an antenna device configured to communicate with external equipment through an electromagnetic signal, the antenna device comprising:
a housing member constituting a housing of the electronic equipment;
an antenna substrate which is arranged on an inner surface of the housing member and around which an antenna coil, which is configured to be inductively coupled to the external equipment, is wound;
a conductive body in the form of a sheet that is arranged on the antenna substrate to be superposed on a portion of the antenna coil; and
a magnetic sheet that is arranged to be superposed on at least a portion of the antenna coil and that is configured to attract a magnetic field emitted from the external equipment to the antenna coil, wherein on a first side of the antenna coil in which a current flowing through wiring of the antenna coil is carried in one direction, the antenna coil is closer to the external equipment than the magnetic sheet is, and/or, on a second side of the antenna coil in which the current flowing through the wiring of the antenna coil is carried in another direction that is opposite to the one direction, the magnetic sheet is closer to the external equipment than the antenna coil and the conductive body are, the conductive body is superposed only on the second side of the antenna coil, and the first side of the antenna coil is located on the peripheral side in the housing member, and the second side of the antenna coil is located on the central side in the housing member.

18. The electronic equipment of claim 17, wherein
the housing member includes a metal portion as a component thereof, and
the conductive body is superposed on a portion of the metal portion.

* * * * *